April 28, 1964

M. V. DI IORIO ETAL 3,131,259

SYSTEMS AND METHODS FOR PROCESSING DATA
OVER TELEPHONE NETWORKS

Filed Jan. 5, 1959

INVENTORS: M. V. DI IORIO
P. J. GRUNFELDER
L. L. SEVEBECK

BY Albert R. Hodges

ATTORNEY

April 28, 1964  M. V. DI IORIO ETAL  3,131,259
SYSTEMS AND METHODS FOR PROCESSING DATA
OVER TELEPHONE NETWORKS
Filed Jan. 5, 1959  12 Sheets-Sheet 3

INVENTORS
M. V. DI IORIO
P. J. GRUNFELDER
L. L. SEVEBECK

BY
Albert R. Hodges
ATTORNEY

April 28, 1964  M. V. DI IORIO ETAL  3,131,259
SYSTEMS AND METHODS FOR PROCESSING DATA
OVER TELEPHONE NETWORKS Filed Jan. 5, 1959  12 Sheets—Sheet 4

INVENTORS:
M. V. DI IORIO
P. J. GRUNFELDER
L. L. SEVEBECK

BY Albert R. Hodges
ATTORNEY

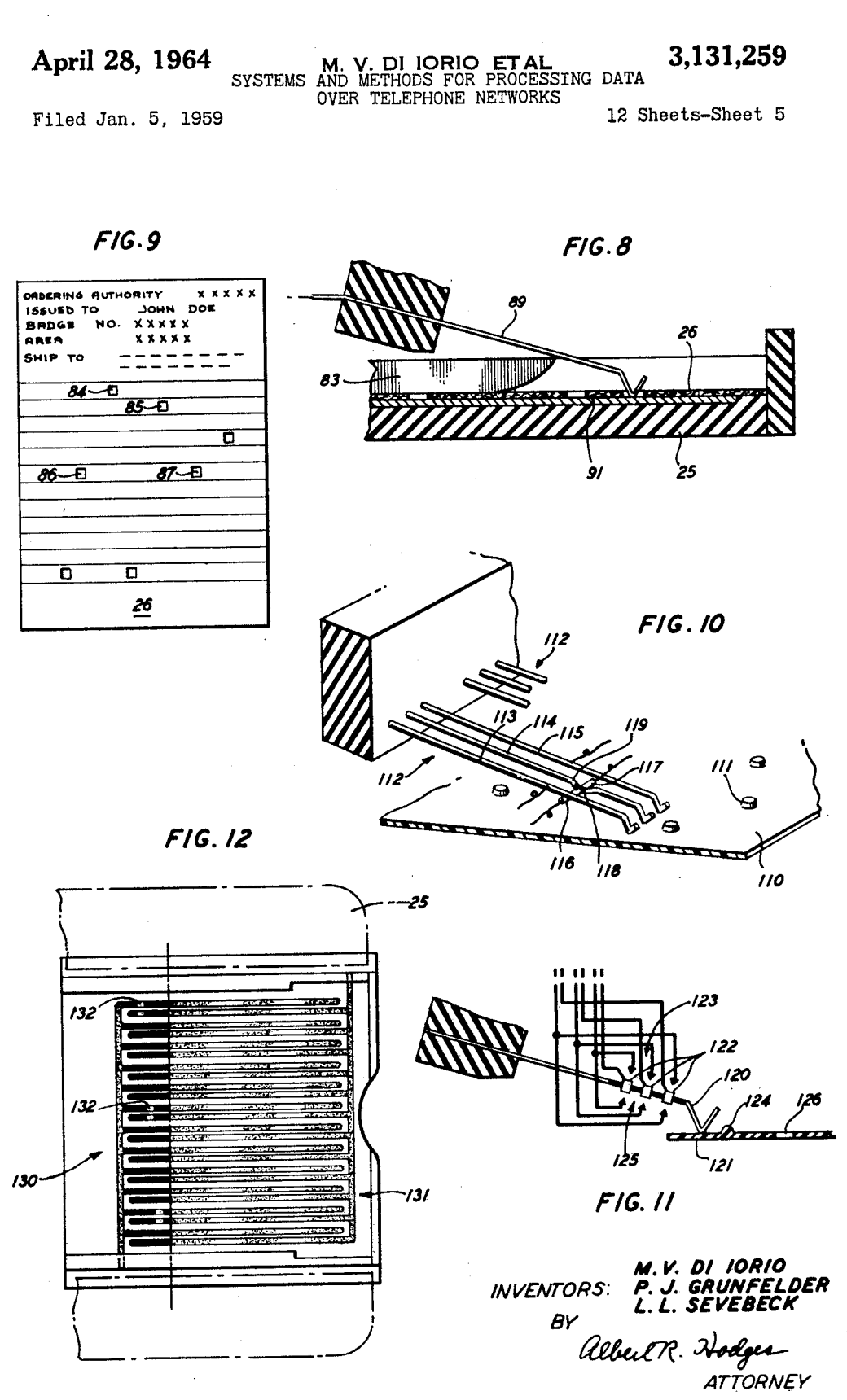

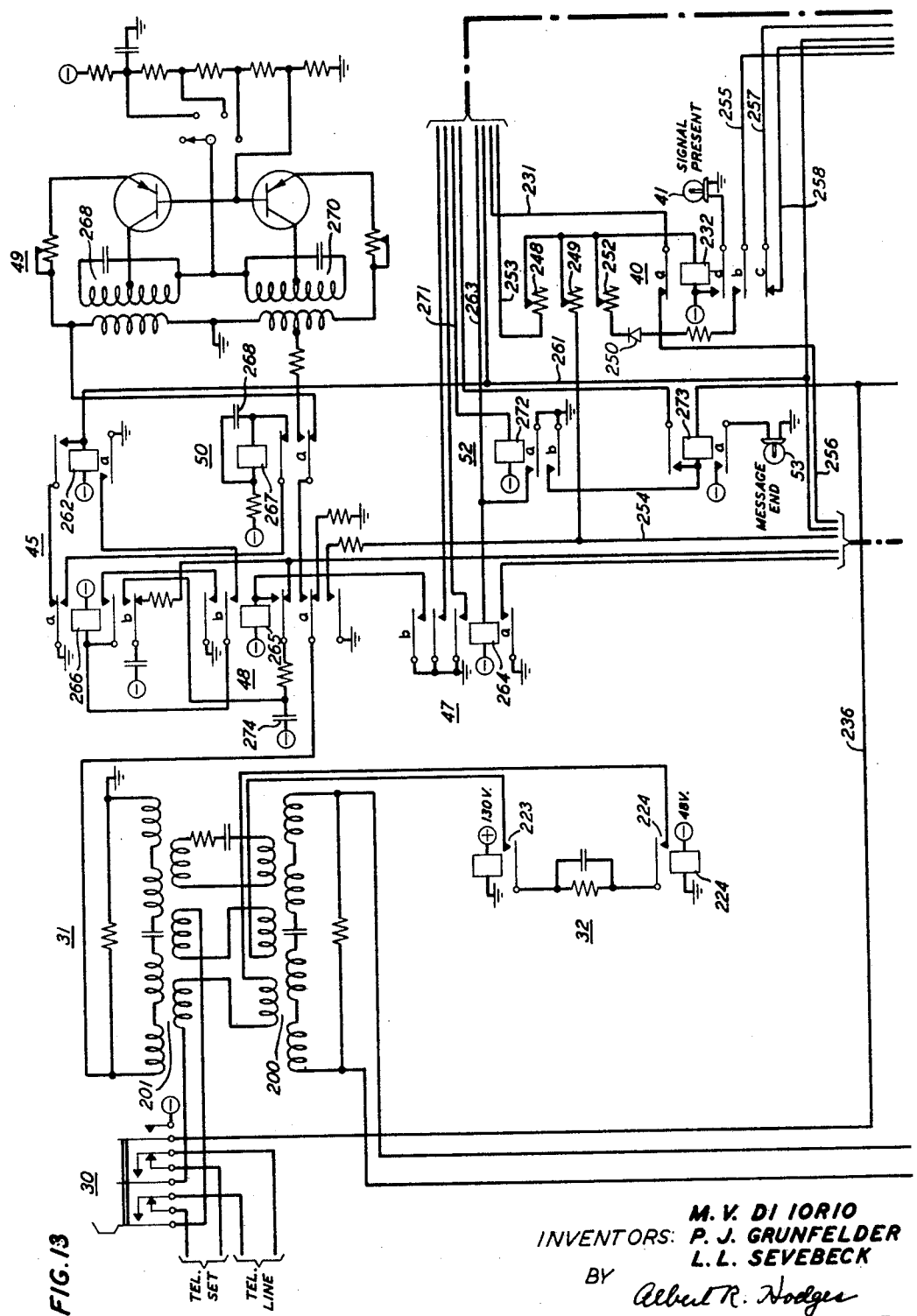

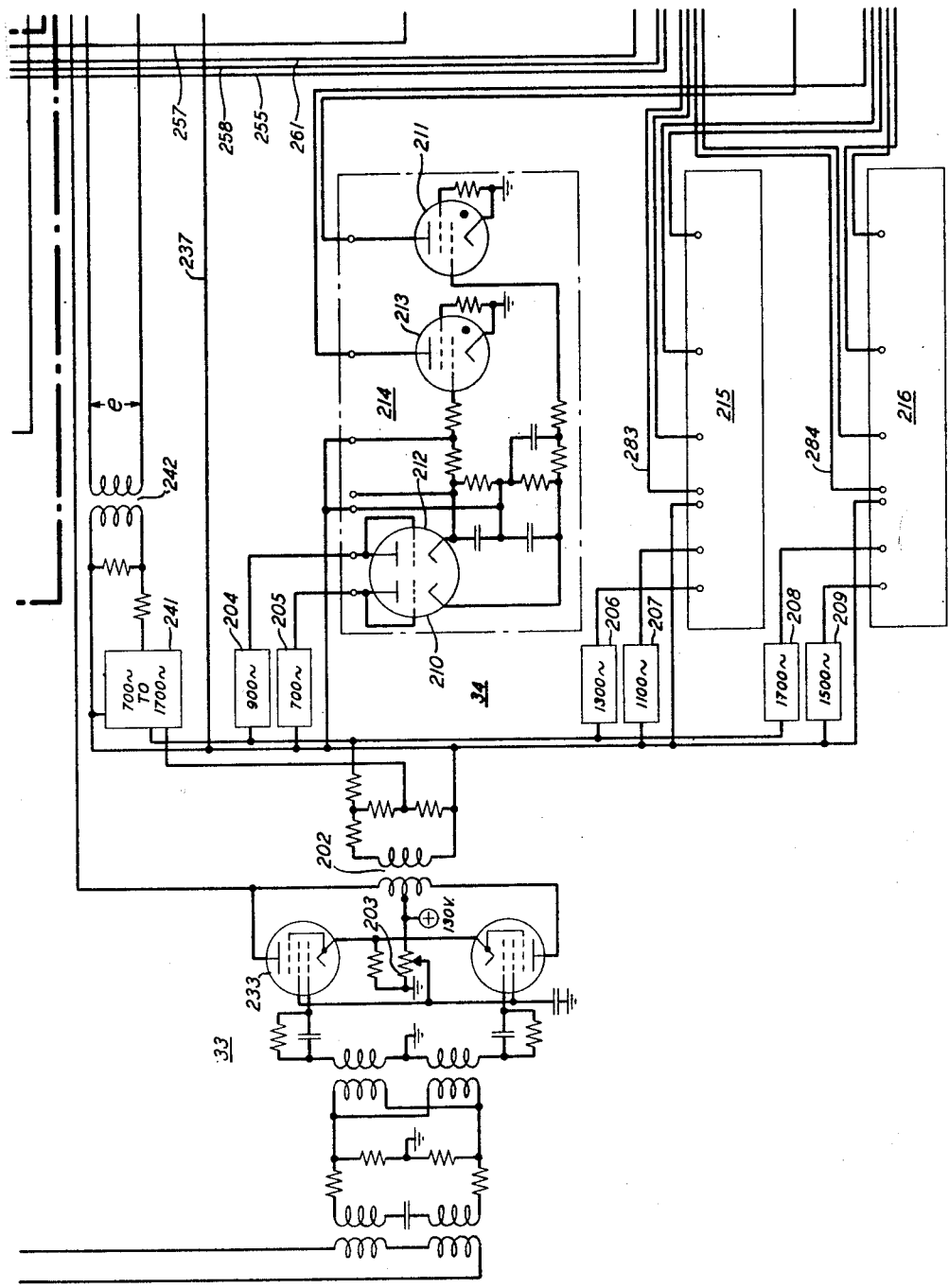

INVENTORS: M. V. DI IORIO
P. J. GRUNFELDER
L. L. SEVEBECK

BY Albert R. Hodges
ATTORNEY

April 28, 1964 M. V. DI IORIO ETAL 3,131,259
SYSTEMS AND METHODS FOR PROCESSING DATA
OVER TELEPHONE NETWORKS
Filed Jan. 5, 1959 12 Sheets-Sheet 9

INVENTORS: M. V. DI IORIO
P. J. GRUNFELDER
L. L. SEVEBECK

BY Albert R. Hodges
ATTORNEY

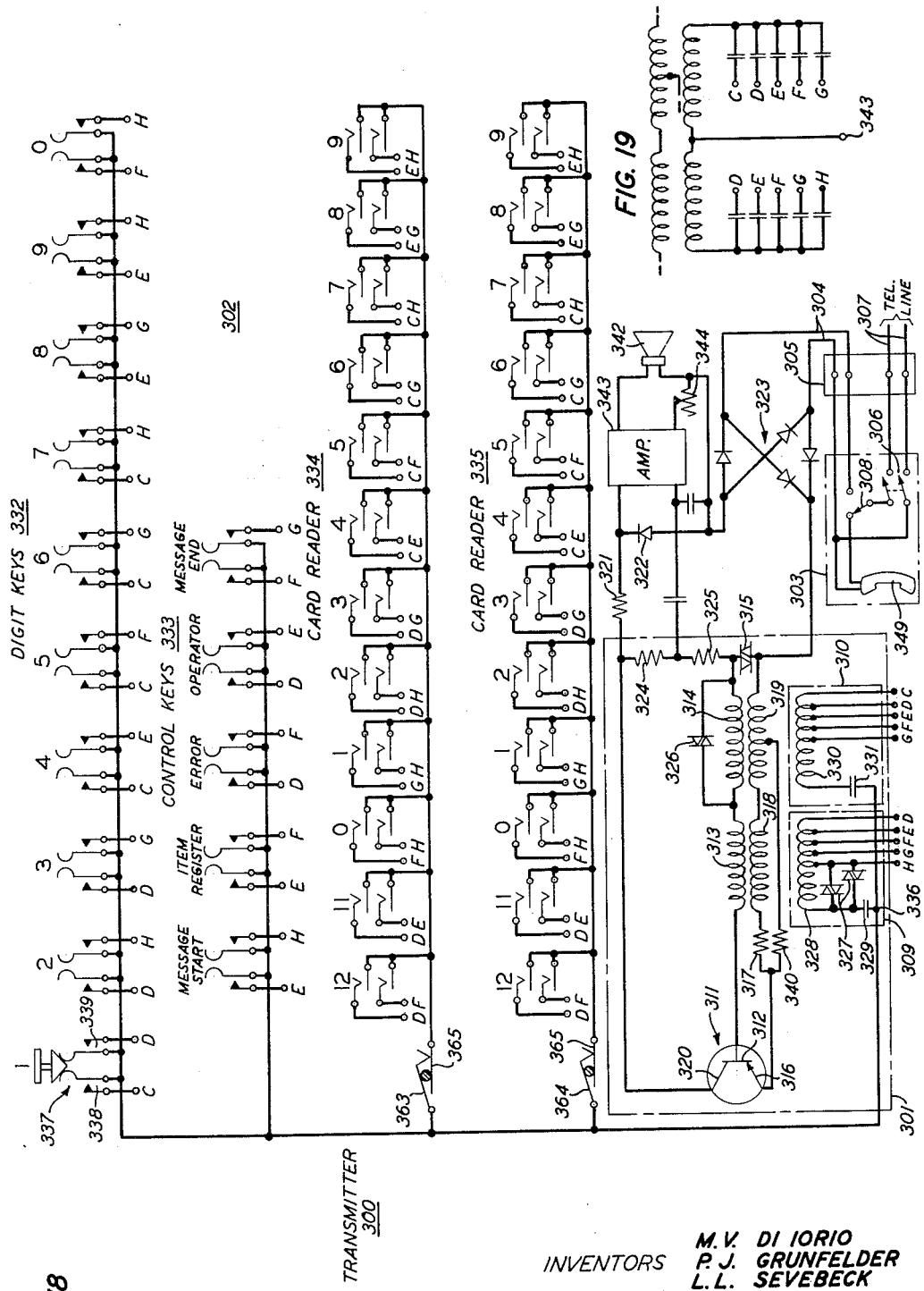

April 28, 1964
M. V. DI IORIO ETAL
3,131,259
SYSTEMS AND METHODS FOR PROCESSING DATA
OVER TELEPHONE NETWORKS
Filed Jan. 5, 1959
12 Sheets-Sheet 11
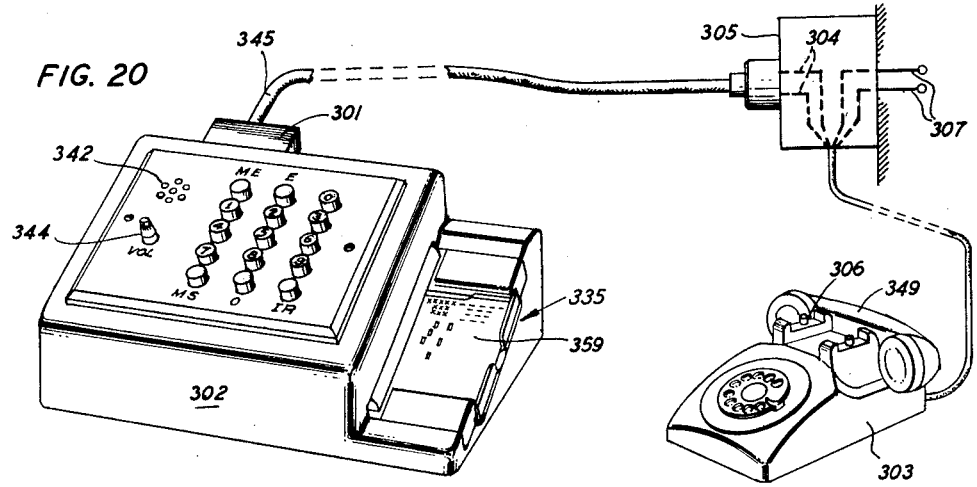
FIG. 20
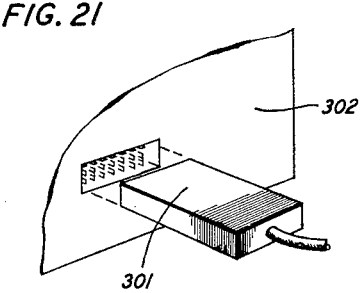
FIG. 21
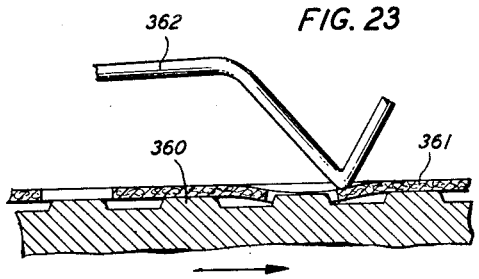
FIG. 23
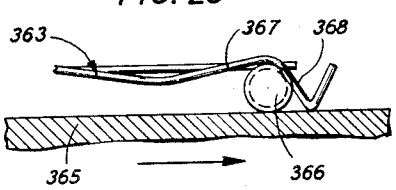
FIG. 25
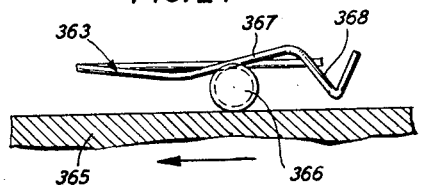
FIG. 24
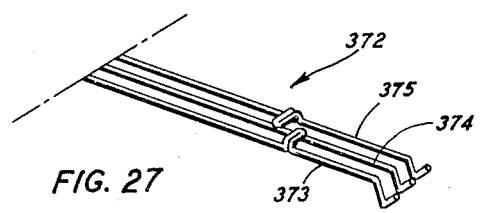
FIG. 26
FIG. 27
INVENTORS
M. V. DI IORIO
P. J. GRUNFELDER
L. L. SEVEBECK
BY
Albert R. Hodges
ATTORNEY

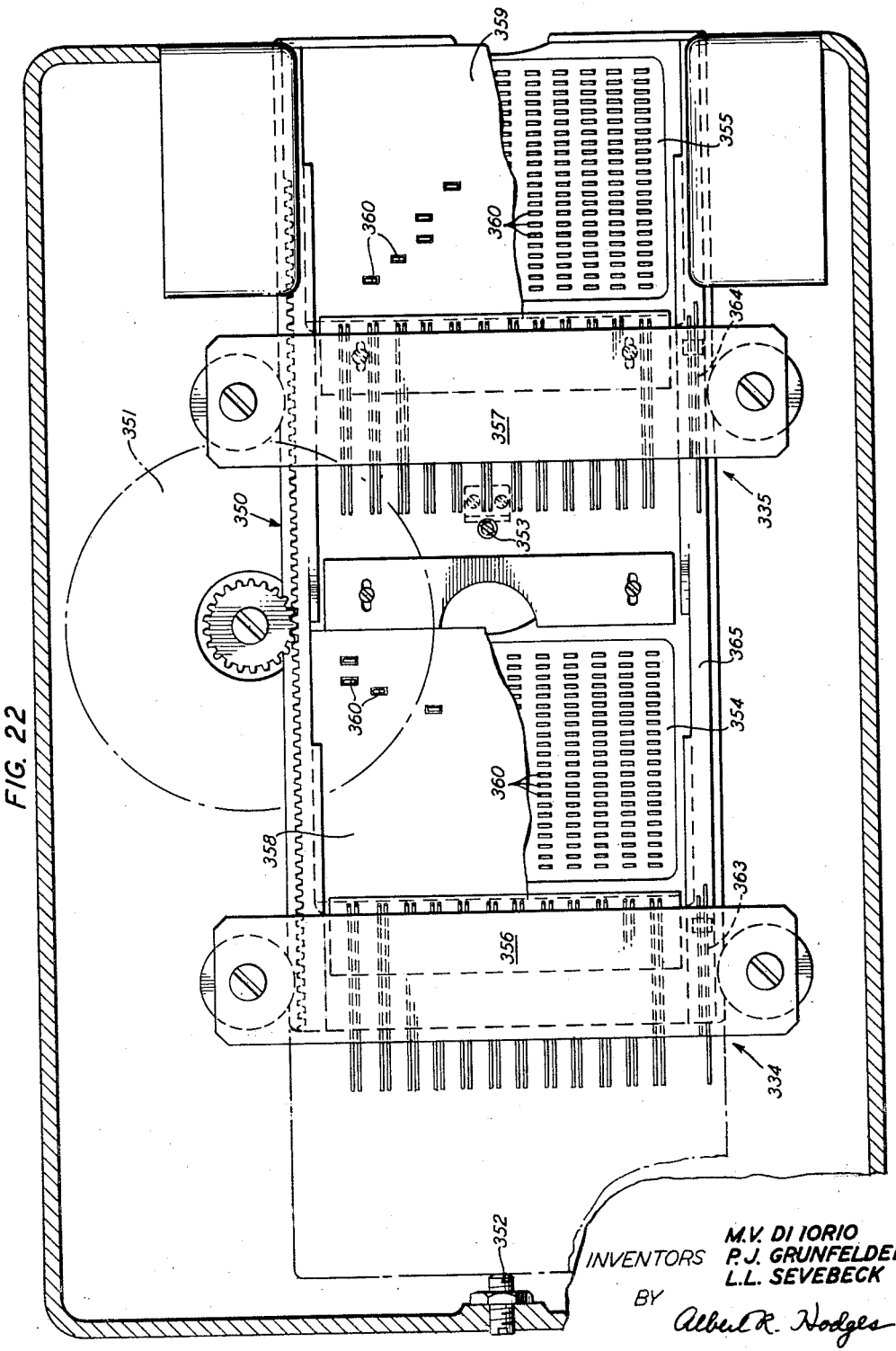

United States Patent Office 3,131,259
Patented Apr. 28, 1964

3,131,259
SYSTEMS AND METHODS FOR PROCESSING
DATA OVER TELEPHONE NETWORKS
Michael V. Di Iorio, Oakland, and Philip J. Grunfelder
and Laurin L. Sevebeck, Mountainside, N.J., assignors
to Western Electric Company, Incorporated, New
York, N.Y., a corporation of New York
Filed Jan. 5, 1959, Ser. No. 784,983
24 Claims. (Cl. 179—2)

This application is a continuation-in-part of application Serial No. 771,291 filed November 3, 1958, now abandoned, which invention relates to systems and methods for processing data over telephone networks.

In the past, data processing systems intended for operation over telephone networks have employed impractically large and expensive equipment. One reason for this is that telephone networks are designed for the transmission of signals within the voice frequency band, while conventional, data-representing signals often encompass a much wider frequency spectrum. Further, telephone a networks are subject to cross-talk, that is, electromagnetic coupling between lines, which may readily interfere with the proper functioning of the receiving units of a data processing system. Moreover, telephone networks often incorporate circuitry such as, for example, echo suppressors, regenerative amplifiers, and the like, which tend to interfere with the transmission of data signals.

An object of this invention is to provide new and improved systems and methods for processing data over telephone networks.

A further object of the invention is to provide methods and means whereby the processing of data over a telephone network may be effected through the medium of efficient but relatively simple, compact and inexpensive equipment.

A method illustrating certain aspects of the invention may include the steps of generating a plurality of A.C. voltages of different frequencies, combining selected ones of these voltages so as to provide for each data character a coded multi-frequency signal, transmitting such coded signals over a telephone network in spaced time relationship, and effecting a determination of the frequencies of the component A.C. voltages of each coded multi-frequency signal sent over the network to provide a reading of each data character.

An apparatus illustrating certain aspects of the invention may include means for generating a plurality of A.C. voltages of different frequencies, means for combining selected ones of these voltages so as to provide for each data character a coded multi-frequency signal, means for transmitting such coded signals over a telephone network in spaced time relationship, and means for effecting a determination of the frequencies of the component A.C. voltages of each coded multi-frequency signal sent over the network to provide a reading of each data character.

The use of coded multi-frequency signals makes available a large selection of data characters within the limited frequency band transmittable by a telephone network. The use of multi-frequency signals also eliminates, for all practical purposes, the possibility that spurious electrical signals will confuse the receiving units of the system. The probability that two of the frequencies utilized will by chance simultaneously be coupled in combination into the network is statistically quite remote. Experimental long-distance transmission of data by the present system has proven its reliability in operation over telephone networks.

An aspect of the present invention is the provision of a transmitter arrangement wherein translator means are directly actuated by input data to produce the coded multifrequency signals. Previously known translator means employed intermediate relays, cold-cathode tube matrices, or the like, which result in large, power-consuming transmitter units. The transmitter of the present invention is extremely compact and inexpensive, with power requirements so small that it may even be powered by a conventional telephone subscriber line.

Broadly, the transmitter comprises a plurality of A.C. voltage generating circuits, each having a different operating frequency. Each of these generating circuits is electrically connected to apply an A.C. voltage to the telephone network when its circuit is closed. A plurality of individual transducer elements, each corresponding to a preselected one of the data characters, is also provided. Each of these transducer elements includes switching means, actuable in response to a mechanical data input, to directly effect the coincidental circuit closure of a preselected plurality of the generating circuits. Actuation of the switching means thereby effects the simultaneous selection, combination and transmission of a plurality of A.C. voltages to produce a coded multi-frequency signal.

In a particular embodiment, transducer elements are provided wherein the switching means may be directly actuated through the medium of mechanical inputs as recorded on a data card. To this end, a feeler means is included as part of the switching means of a transducer element. Means are provided for positioning the face of a data card in physical contact with the feeler means. The feeler means is biased against the data card and means are provided for effecting relative movement therebetween. In this way, the feeler means is designed to be physically translated, to actuate the switching means, in response to the encountering of a mechanical input on the data card. A further aspect of the invention is the provision of a number of alternative transducer forms, adapted for direct data card actuation.

The multiplicity of factors inherent in a telephone network which are capable of producing errors in a receiver circuit has been one of the major causes heretofore preventing the successful processing of data over a telephone network. Another aspect of the invention is the provision of a receiver unit especially designed to provide error-free processing of transmitted data into a usable output form. For this purpose, the receiver unit includes a multiplicity of checks which infallibly detect processing errors. Wherever possible, these checks are designed to prevent error. Where detection alone is possible, the invention provides circuitry which indicates the presence of a detected error immediately after each item of information has been transmitted. Existing errors may thus be localized and assigned to a particular item, and errors may be eliminated simply by item repetition.

The systems and methods of the present invention are admirably suited for a wide variety of data processing functions. For example, they may be employed to simplify and greatly expedite the processing of warehouse orders. Even the smallest and remotest of stations could readily be provided with a transmitter according to the invention because of its small size and low cost. Such station may transmit information to a receiver unit at a central warehouse where the information could be further processed through computing machines and the order rapidly expedited. Other applications include the transmission of data relating to the payment of bills, attendance time card information, production control information, and the like.

THE DRAWINGS

The invention will be clearly understood by reference to the following description and the accompanying drawings, in which:

FIG. 8 is an enlarged sectional view of the card reader tray of FIGS. 5 and 6, showing the action of the transducer elements in reading a perforated data card;

FIG. 9 is a plan view of a perforated data card;

FIG. 10 is a perspective view of a transducer means adapted to read an embossed data card;

FIG. 11 is a schematic view of a transducer means adapted to read either embossed or perforated data cards;

FIG. 12 is a fragmentary plan view of a card reader adapted to automatically transmit selected data;

Figure 1:
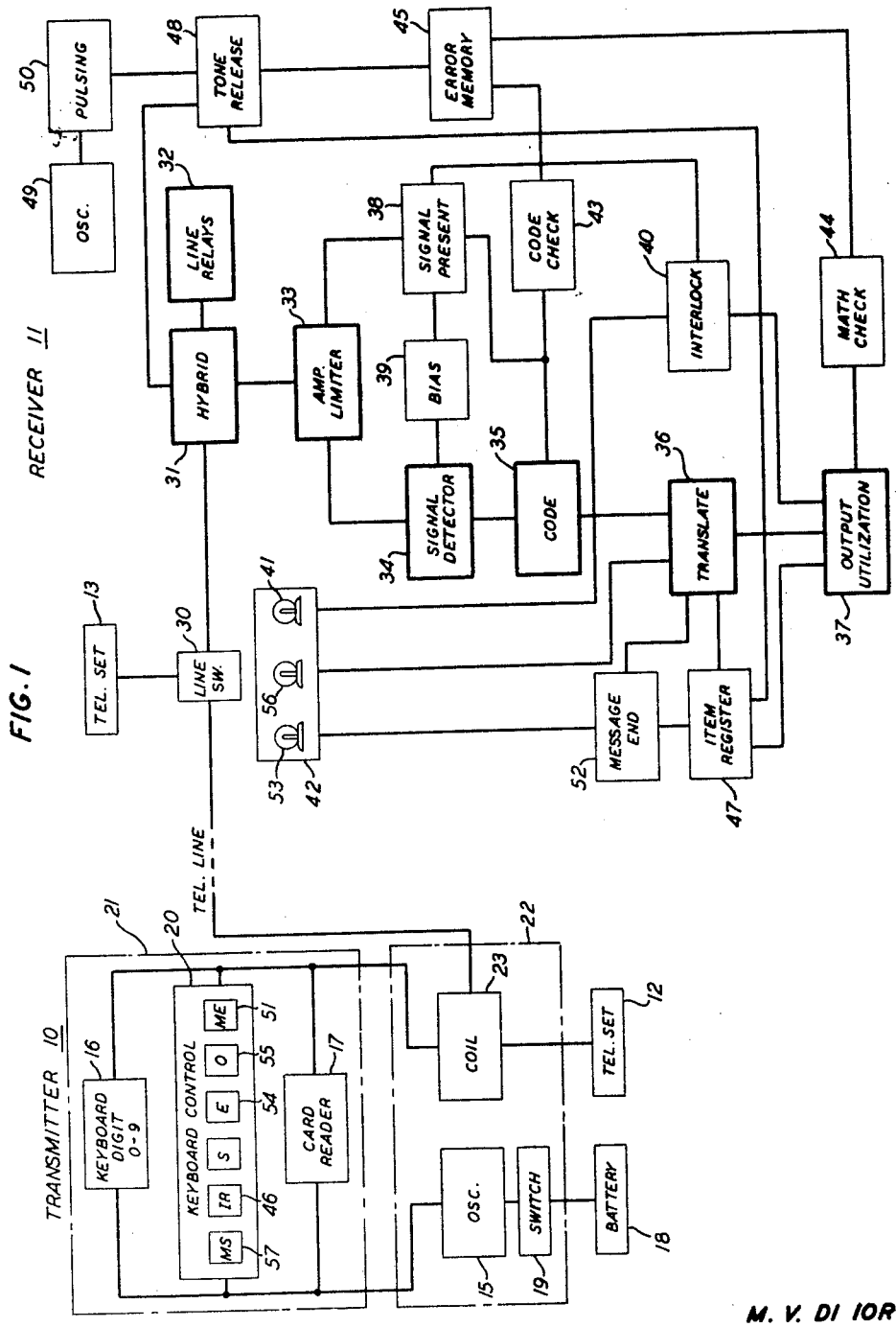
FIG. 1 is a block diagram of a data processing system in accordance with the invention.

FIGS. 13–16 together comprise a detailed circuit diagram of the receiver section shown in FIG. 1;

FIG. 17 shows the arrangement of FIGS. 13–16 to provide a unitary receiver circuit diagram;

FIG. 18 is a detailed circuit diagram of a modified transmitter unit in accordance with the invention;

FIG. 19 is a circuit diagram of alternative resonant circuit means which may be employed in the transmitter unit of FIG. 18;

FIG. 20 is a perspective view of the transmitter unit shown in FIG. 18;

FIG. 21 is a partial rear view of the transmitter unit of FIG. 20 showing the oscillator unit connection;

FIG. 22 is a plan view of the transmitter unit of FIG. 20 cut away to show the card reader unit;

FIG. 23 is an enlarged sectional side view of the card reader of FIG. 22, showing the manner of operation of the surface embossments;

FIGS. 24 and 25 are enlarged sectional side views of a switching unit providing for one-way operation of the card reader of FIG. 22;

FIG. 26 is a perspective view of the switching unit of FIGS. 24 and 25; and

FIG. 27 is a perspective view of a transducer means adapted to read a data card.

GENERAL DESCRIPTION

Referring to FIG. 1, the data processing system of the present invention may broadly be divided into two sections, a transmitter 10 and a receiver 11. Both the transmitter and receiver sections are provided with a conventional telephone set, 12 and 13, respectively. To interconnect the two sections, the operator at the transmitter need only call a receiver station and establish voice contact. The operator at the receiver station may then switch a receiver unit onto the talking circuit established. Where required, a number of receiver units may be located at a busy receiver station in order to accommodate incoming calls. In that event, automatic interconnection and allocation of available receiver units may be effected by means of a conventional telephone PBX.

Transmitter

It is the primary function of the transmitter to accept data information in a mechanical input form, and to translate the information into the coded electrical signals prescribed by the invention. The transmitter also functions to provide operator-initiated control signals for the receiver.

In its first function, the transmitter operates to translate each character of input information into an electrical signal comprising two or more A.C. voltages of different frequencies, the combination of frequencies selected being representative of the character. For this purpose, the transmitter is provided with an oscillator circuit 15 designed to make available for selection a plurality of A.C. voltages of different frequencies. Transducer means are also provided for the mechanical insertion of data information. Such means may advantageously take the form of a keyboard 16 and a card reader 17.

A number of multiple-frequency codes for character identification may be utilized. For example, each character may be assigned two out of six available frequencies. In this manner, 15 possible frequency combinations are available.

If more combinations are desired, a code may be employed wherein three frequencies are assigned to each character out of twelve frequencies available. This code provides 64 possible combinations. Other even more complex codes may be employed if desired, without extending the frequency range beyond that transmittable through a telephone network. It has been found, however, that with a simple two-out-of-six code, the present system is capable of effecting a large variety of data processing functions. For this reason, in the specification the system will generally be described with reference to such a code.

In operation, oscillator circuit 15 is energized from a battery 18 through a switch 19. Battery 18 is the only source of power required by the transmitter portion of the system. With a preferred embodiment of oscillator circuit 15, the power needs of the transmitter may be so small as to be provided directly from a telephone subscriber line. The small power needs of the transmitter derive from the provision, according to the invention, of a translator means which directly translates the mechanical data input at the transducers into the electrical multi-frequency output. This translator means, which forms an important part of the invention, is described in a more detailed portion of the specification to follow.

To produce receiver control signals, the transmitter employs a keyboard 20. The control signals are multi-frequency signals as in the case of data transmission. In this case, the signals are coded in terms of the desired control functions.

Figure 3:
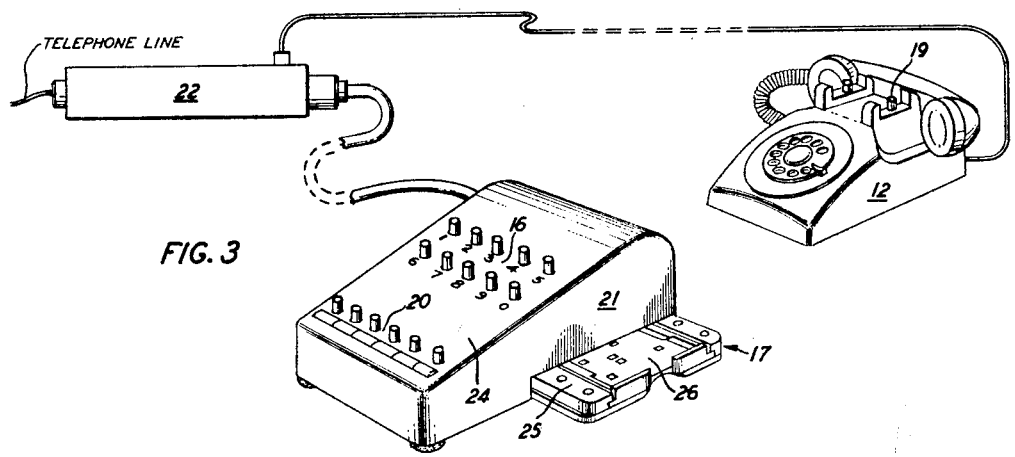
FIG. 3 is a perspective view of the data processing transmitter section shown in FIG. 1.

The extreme compactness of the transmitter unit is shown in FIG. 3. It is comparable in size to a telephone set, whereas the somewhat similar units previously known were desk size or larger. The transmitter is advantageously packaged in two portions, a data input translator unit 21 and an auxiliary unit 22. Translator unit 21 contains the transducer means for inserting data information into the system, that is, keyboards 16 and 20, and card reader 17. Auxiliary unit 22 contains oscillator circuit 15 and a coil circuit 23 through which the translator circuit connects to the telephone lines. The containment of the translator unit in a separate package is prescribed in order that it be independent of frequency. Thus a standard translator unit may be manufactured and utilized in any location regardless of the frequency code there employed.

In the translator unit, data information keyboard 16 and control keyboard 20 are arranged on an inclined face 24 (FIG. 3). Card reader 17 is arranged at one side of the package. It comprises a tray 25 into which a data card 26 is inserted. The card carries data information recorded on its face in the form of a coded arrangement of perforations or embossments. To translate such a record into electrical signals, the tray is moved relative to a transducing means in the translator.

Telephone set 12 may advantageously be employed for monitoring the receiver section of the system. In that event, the telephone receiver is not replaced in its cradle after establishing telephone contact, but remains operative during the processing of data. The switch hook in the telephone cradle may then advantageously be employed as oscillator power switch 19 to conveniently switch the transmitter into and out of operation with the initiation and breaking of telephone contact.

Receiver

The receiver functions to retranslate the coded multi-frequency electrical signals from the transmitter into a usable output form. Furthermore, the receiver is adapted to insure error-free processing of the data information.

To effect the first of these functions, the receiver is switched onto a telephone line by means of a line switch 30. As indicated hereinbefore, the line switch may take the form of a P.B.X system. The input signal from the telephone line is then applied to a hybrid circuit 31, which automatically functions to route signals into or out of the receiver. A line relay circuit 32 is associated with the hybrid circuit and functions to maintain telephone contact with the transmitter so long as power is on in the receiver. In the event of receiver power failure, telephone contact is broken by line relay circuit 32 and the transmitter is thus notified.

The input signal passing through the hybrid circuit is applied to an amplitude limiter circuit 33. This circuit functions to insure that an input signal of the proper amplitude for processing is provided to the remainder of the receiver. The output of amplitude limiter 33 is applied to a signal detector circuit 34. This circuit analyzes the input signal and determines the frequencies of its component A.C. voltages. Sharply tuned filter circuits are employed in signal detector circuit 34 so that only signals having combinations of the available system frequencies may pass therethrough. This prevents spurious signals from entering into the system to produce errors in the data processing.

The output of signal detector 34 is applied to a code circuit 35, which produces electrical signals indicative of the component frequencies of the input signal. These electrical signals are applied to a translate circuit 36. Translate circuit 36 functions to produce an electrical signal indicative of the information character represented by the frequencies received. Finally, the electrical signals produced by translate circuit 36 are applied to an output utilization unit 37. This unit may take a variety of forms well known in the art. For example, it may be adapted to provide an indication readable by a human operator, or an output readable by an electronic computing machine. In the latter case, output utilization unit 37 may advantageously take the form of a key punch for the production of coded data cards. Because of the method provided by the invention for electrically processing data information, a minimum of equipment is required by the receiver in its retranslate function. The details of this equipment are described later in the specification.

The second function of the receiver is effected by means of a plurality of checks which guarantee error-free data processing throughout the system. A first of these checks is designed to prevent receiver confusion caused by the application of two input signals substantially simultaneously. In this check, a signal present circuit 38 is employed. The input signal passing through amplitude limiter circuit 33 is applied to signal present circuit 38 simultaneously with its application to signal detector circuit 34. Signal present circuit 38 is adapted to produce an output as long as this input signal is applied. This output is connected to a biasing circuit 39, which in turn is connected to signal detector circuit 34. Biasing circuit 39 is adapted to apply a voltage cutting off signal detector circuit 34 in response to the application thereto of the signal present output. In this way, the signal detector circuit is rendered inoperative to all subsequent signals coming into the receiver so long as a prior input signal is present. Upon removal of this input signal, signal present circuit 38 no longer produces an output, the bias is therefore removed, and signal detector circuit 34 is again ready for operation.

Signal present circuit 38 also performs another error-prevent function in the form of a second check which insures that the receiver will not be operated by spurious signals. To this end, code circuit 35 is so arranged that it will not accept the output of signal detector 34 unless first triggered into readiness by the output of signal present circuit 38. In this way, the receiver responds only to those input signals having the appropriate amplitude, time duration and frequency to be sensed by the signal present circuit.

A further check prevents a signal from translate circuit 36 from being applied to output utilization unit 37 for a period of time longer than that required for its registration. This prevents the multiple registration of character information. As soon as output utilization unit 37 has effected its signal registration, it sends a signal to an interlock circuit 40 notifying it of that fact. Interlock circuit 40 is switched to disconnect the output signal from translate circuit 36 to output utilization circuit 37 at that time. The interlock circuit is then locked in this state by signal present circuit 38 so long as the signal registered is applied to the receiver. As soon as the input signal is removed, interlock circuit 40 returns to its original state, reconnecting the output of translate circuit 36 to output utilization unit 37 in preparation for the reception of another signal.

Interlock circuit 40 is also adapted to send a voltage to a lamp 41 in a control box 42 each time it receives an output voltage from signal present circuit 38. This causes a light to flash at the control box, indicating to the operator that signals are being received and processed by the receiver.

A further error sensing function is provided by a code check circuit 43. This circuit determines whether the signal received comprises the prescribed number of frequencies or, due to a fault in the transmitter, spurious reception, or the like, more than the prescribed number of frequencies. Code check circuit 43 is connected to code circuit 35. If more than two component frequencies are sensed at code circuit 35, code check circuit 43 produces an output signal indicating such error. Other checks are provided to detect input signals comprising less than the prescribed number of frequencies.

A final system check is provided by means of a mathematical check unit 44. Such units are well known in the art. In the present system the mathematical check insures the error-free processing of information inserted into the system through the medium of data card reader 17. Each data card is provided with a check number arrived at through a prescribed mathematical calculation involving its recorded characters of data information. In operation, the check number is transmitted through the system with the data information, both being applied from output utilization unit 37 to mathematical check unit 44. Therein, the prescribed mathematical calculation is effected and the result compared with the check number. If the result and the check number do not correspond, mathematical check unit 44 determines that an error has been made and produces an output signal indicative of that fact.

The mathematical check so effected provides a substantially foolproof guarantee against errors in the data processing for information through the medium of a data card. For example, assume that it is desired to send the characters 1, 2, 3, 4 and 5, in that order, through the system. A mathematical check which may advantageously be utilized in the present system prescribes that alternate information characters, starting with the first character transmitted, be selected and the resultant figure doubled, giving, $135 \times 2 = 270$. The numerals in the resultant number are then added, providing $2+7+0=9$.

To this result are added alternate information characters, starting with the second character transmitted, to give 9+2+4=15. And finally, this result is subtracted from the next highest multiple of 10, or 20−15=5. The data card is therefore adapted to transmit the numerals 1, 2, 3, 4, 5, 5 as an item, the latter 5 being the check number.

This mathematical check will detect a wide variety of errors. For example, suppose the data card is inserted into the card reader backwards so that the numerals 5, 5, 4, 3, 2, 1 are transmitted in that order. The calculation effected will then give a check number other than 5 since the first step will result in the doubling of 542 rather than of 135. Other errors detected by the mathematical check include the partial insertion of the data card into the reader, the reception of a character other than that transmitted, the reception of the incorrect number of characters, and so forth.

It will be noted that the last two checks described are not preventative of errors, but rather produce signals indicating the detection of an error. An aspect of the present invention is the provision of means whereby the receiver is interrogated after each item of information has been transmitted to determine whether or not there has been an error in the processing. The output signals of both mathematical check circuit 44 and code check circuit 43 are fed into an error memory circuit 45. All indications of errors detected during the transmission of an item are there stored until required. At the end of the transmission of an item, the operator of the transmitter so informs the receiver by depressing a control button 46 herein denoted as "Item Register." The translator then sends an appropriately coded multi-frequency signal to the receiver. Translate circuit 36, upon receiving such a signal, sends an output to an item register circuit 47. This circuit performs two functions. First, it sends a signal to output utilization unit 37 clearing it for the reception of a subsequent item. Second, it sends a check signal to a tone release circuit 48 indicating to it that a complete item has been transmitted.

It is the function of tone release circuit 48 to transmit through hybrid circuit 31 a signal indicating to the transmitter whether or not an error has been detected. To this end, tone release circuit 48, upon being actuated by item register circuit 47, interrogates error memory circuit 45 to determine whether or not an error indication has been stored therein. If no error is detected, tone release circuit 48 merely acts as a switch which, when actuated by item register circuit 47, permits a steady signal from an oscillator circuit 49 to be applied through hybrid circuit 31 to the telephone line. If it finds that an error indication has been stored in memory circuit 45, however, tone release circuit 48 actuates a pulsing circuit 50 adapted to pulsate the output of oscillating circuit 49. Thus a pulsating error signal, easily distinguished from the steady signal denoting the absence of error, is sent to the transmitter. These signals may advantageously be received as audible tones at the receiver of the transmitter telephone set.

The system also provides a variety of receiver controls, available at the transmitter, which have been found to be of advantage. One such control is provided through a push button 51, denoted "Message End." This button produces an appropriately coded multi-frequency signal which is transmitted to the receiver and decoded at translate circuit 36. Upon determining its meaning, translate circuit 36 sends an output signal to a message end circuit 52. This circuit performs substantially the same operations as does item register circuit 47. In addition, it sends a voltage to a lamp 53 at the control box informing the receiver operator that a total message has been sent and that the receiver may be taken off the line.

Another control available in the system is provided by a push button 54, denoted "Error." This control is actuated by the transmitter operator upon realization that an error has been committed by him in entering data. Again a coded multi-frequency signal is transmitted to the receiver and read by translate circuit 36. In this case, translate circuit 36 sends a signal to output utilization unit 37, clearing all registered characters to prepare it for the repetition of the item in error.

A further control is provided by a push button 55 denoted "Operator" and adapted to produce still another coded multi-frequency signal. This signal actuates translate circuit 36 to send an output voltage to a lamp 56 on the control box, thereby to gain the operator's attention. Advantageously, a buzzer or some other audible signal may be utilized in conjunction with or instead of lamp 56.

A final control which has been found useful is provided by a push button 57 denoted "Message Start." This button is actuated immediately prior to the transmission of data information. It produces a multi-frequency signal coded to switch the receiver into operation. Prior to that time the receiver is made unresponsive, thus protecting it from spurious signals.

It will be noted that hybrid circuit 31 is employed in the receiver to provide for the transmission of signals in either direction over the telephone network. In its simplest form, a two-way switch could be employed since information is transmitted in only one direction at any given time. This unidirectional aspect permits the present system to operate in conjunction with telephone networks having echo suppressors therein. Echo suppressors prevent the transmission of information in two directions at the same time. For this reason, data processing systems utilizing bi-directional transmission cannot operate over existing telephone networks. It is conceivable, however, particularly in short distance transmission, that the data processing system of the present invention may be employed with networks not having echo suppressors and therefore permitting bi-directional transmission. In this event, the system may advantageously employ a hybrid circuit adapted for bi-directional transmission. Such transmission permits the receiver to send a signal back to the transmitter continuously during the processing of data information. This provides a circuit assurance check wherein a continuous signal from the receiver to the transmitter indicates to the operator that the receiver is in operation.

DETAILED DESCRIPTION

Transmitter

Figure 2:
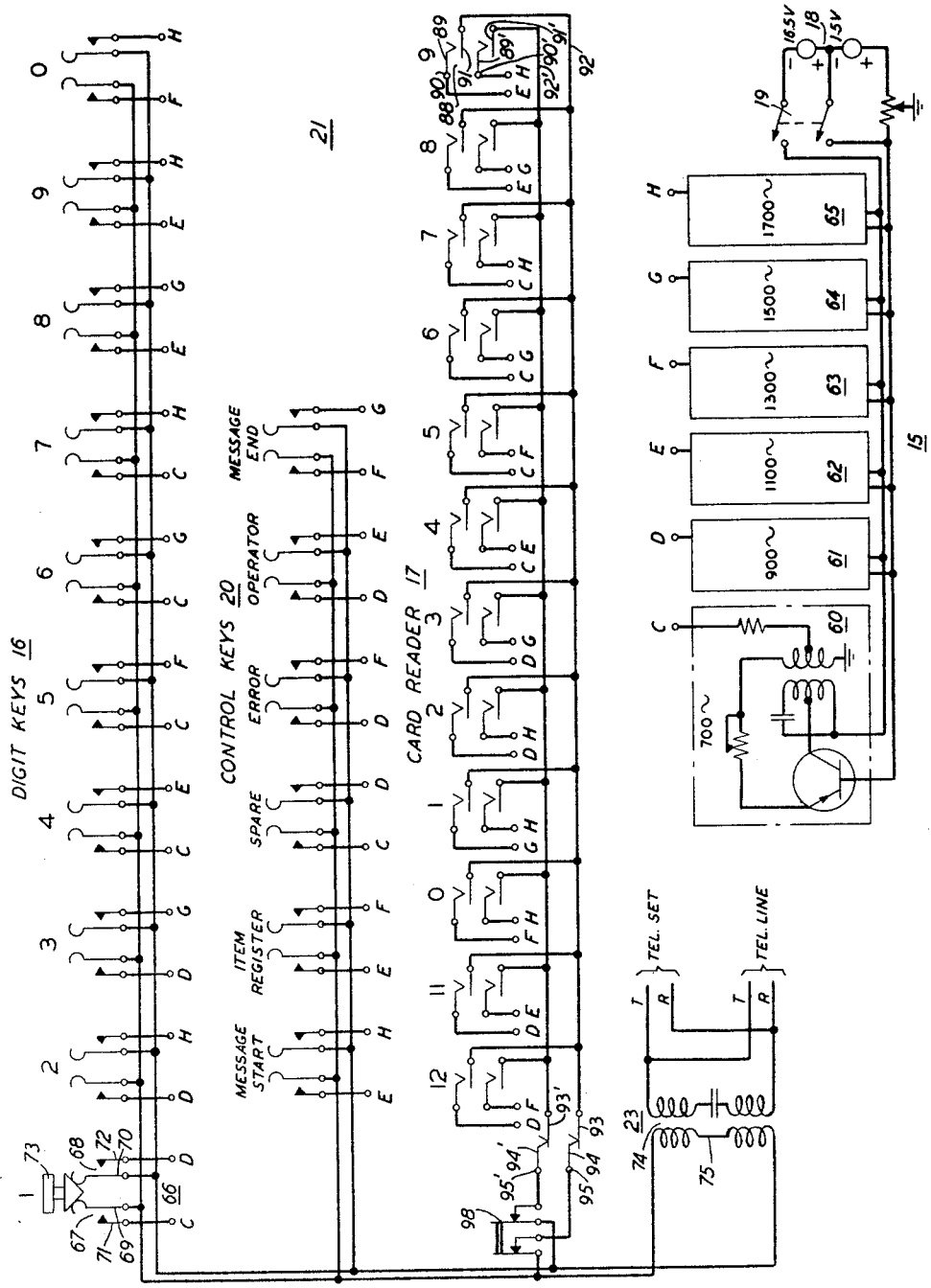
FIG. 2 is a detailed circuit diagram of the transmitter section shown in FIG. 1.

One preferred transmitter section in accordance with the invention is schematically illustrated in detail in FIG. 2. Sections of the schematic diagram corresponding to the blocks of FIG. 1 are identically numbered. The data input translator section is shown generally at 21, the oscillator at 15, and the coil circuit at 23.

Translator section 21 incorporates the transducing means whereby data information and control commands are inserted into the data processing system. In this embodiment, the transducing means comprises a card reader 17, a data information keyboard 16, and a control keyboard 20.

Oscillator section 15 provides a plurality of A.C. voltages of different frequencies for the production of multi-frequency signals. In this embodiment, the oscillator section comprises a plurality of individual oscillators 60, 61, 62, 63, 64 and 65 each tuned to a different frequency. The oscillator frequencies are chosen to be within the frequency band transmittable by a telephone network but to have sufficient separation therebetween to permit ease of discrimination. A frequency range from 700 c.p.s. to 1700 c.p.s. with 200 c.p.s. separation between frequencies has been found satisfactory. For convenience, the output of each oscillator is designated by a letter of the alphabet. Thus the 700 c.p.s. output of oscillator 60 is designated by the letter C, the 900 c.p.s. output of oscillator 61 by the letter D, and so on.

Oscillator 60 is shown in detail to illustrate one embodiment advantageously employed. The circuitry is simple and conventional, transistorization being preferred in the interest of compactness and minimization of power requirements. The oscillators are powered by means of battery 18 through switch 19. This is the only source of power required by the transmitter.

In the frequency code employed, two frequencies are assigned to represent each information character. With six oscillator frequencies available, 15 different characters of information may be represented by the electrical signal output of the transmitter. Translator section 21 is adapted to convert mechanical input data into these electrical signals. To this end, the translating means incorporates a multiple closure principle fundamental to the invention.

In accordance with this principle, each individual transducer element comprises a switching means adapted to simultaneously effect a plurality of closures upon being actuated. In the present embodiment, because of the frequency code employed, two such closures are required. The switching means may advantageously take the form generally designated by reference numeral 66. There the switching means comprises two switching elements 67 and 68, each having a movable contact, 69 or 70, and a stationary contact, 71 or 72. The movable contacts are adapted to be simultaneously translated to effect switching closure. In the keyboards, actuation may be effected by means of a push button 73. Actuation at the card reader, however, advantageously takes a form provided by the invention and described later in the specification.

Each transducer element is assigned a different one of the characters of data information to be transmitted. For example, the transducers of keyboard 16 are assigned the numerals 0–9. Further, each of the characters of data information is assigned a different two-frequency combination as defined by the code employed. Thus, character (1) is assigned the frequencies C and D, character (2) the frequencies D and H, and so on.

In the translating function, each transducer means, upon being actuated, operates to produce an electrical signal having the frequency combination assigned to the character represented by that transducer. Each of the switching elements of a transducer element is connected to the output of a different one of the oscillators. The oscillators selected are those which provide the frequencies representative of the character assigned to the transducer. For example, in transducer 66, contact 71 of switching element 67 is connected to oscillator 60 at output C, and contact 72 of switching element 68 is connected to oscillator 61 at contact D. Further, each switching element is connected to apply the oscillator output connected to it to the telephone network. More particularly, contact 69 of switching element 67 and contact 70 of switching element 68 are both connected to a winding 75 of an output transformer 74. In this way, the actuation of transducer 66, representing the character (1), simultaneously effects circuit closure to the telephone network of both oscillators 60 and 61. This applies to the network A.C. voltages having the representative frequencies. Further, contacts 69 and 70 are connected to opposite sides of winding 75 of output transformer 74. The voltage outputs of the two oscillators thus combine across winding 75 to produce a multi-frequency output signal as prescribed by the invention.

The remainder of the transducer elements, both in the keyboards and card reader, also effect simultaneous circuit closure for connecting selected oscillator outputs to the telephone line. The only difference between different transducer elements lies in the selection of oscillator outputs. In some instances the same frequency combination may be employed to represent two different characters. For example, the frequencies E and H are employed to represent both the character (9) and the control command "Message Start." Such duplication is possible where discrimination is provided by the order of transmission. It will be noted that twelve transducer means are employed in the card reader. In this way, enough signals are made available so that the card reader may send alphabetical characters as well as the numerical characters indicated.

With the multiple closure system as provided by the present invention, selection of voltages, combination of voltages, and transmission of the resultant combination, this combination representing a character of data information, may be effected in a single, direct mechanically initiated step. The means for effecting such step are extremely simple, compact, inexpensive, and require very little power.

The present invention further provides an arrangement whereby multiple switching closure in the card reader may be effected by extremely simple, compact and direct mechanical means. This arrangement will be described with reference to FIGS. 3–8 wherein a particular embodiment is shown. In this embodiment, a card 26, such as that shown in FIG. 9, is employed to insert data information into the translator section of the transmitter. The data information is recorded on the face of the data card in the form of mechanical inputs positioned in a preselected coded arrangement. In the card shown, the mechanical inputs take the form of perforations. Each perforation represents a preselected character, the identity of the character being indicated by the row of the card in which the perforation is positioned. Thus, for example, perforations 84 and 85 indicate different characters, while perforations 86 and 87 indicate the same character.

Figure 5:
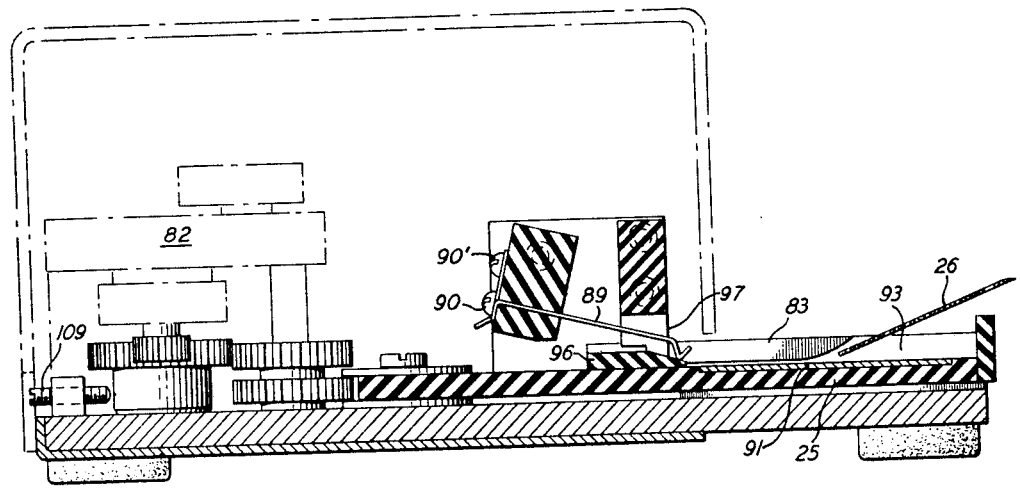
FIG. 5 is a section taken along line 5—5 of FIG. 4.

The card reader comprises a tray 25 adapted to receive data card 26, as is best shown in FIGS. 3 and 5. The card is inserted so that its character-representing rows lie in the direction of travel of the tray. To retain the card in this position, the tray is provided with guides 83 under which the card is slipped. Tray 25 is further adapted to be manually translated from its normal position, and spring biased to return to its normal position at a substantially constant rate of speed after having been so translated. This is conveniently effected by mechanically connecting a rack 80 and a gear 81 to a spring system controlled by a governor assembly as shown generally at 82. The governor and spring assembly may be, for example, of the type utilized in controlling the return, after manual displacement, of conventional telephone control dials. Stops 109 are employed to limit the travel of the tray.

Figure 4:
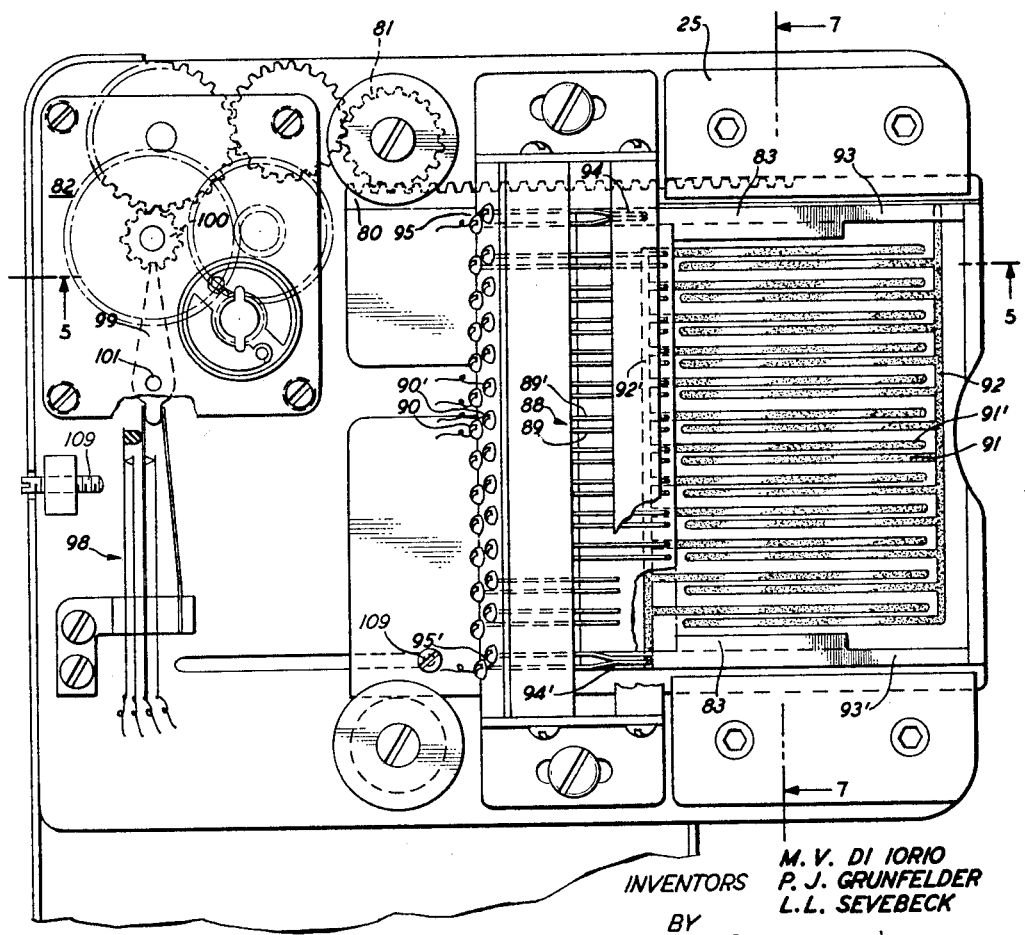
FIG. 4 is a plan view of the data input translator section of FIG. 3 with the case removed and portions broken away to show the card reader assembly.
Figure 7:
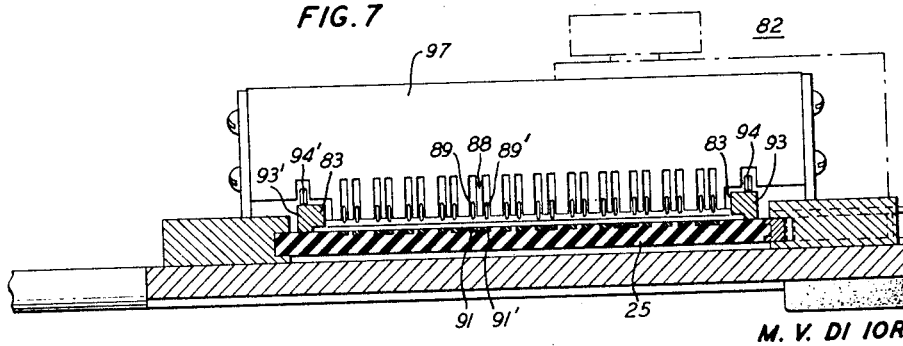
FIG. 7 is a section taken along line 7—7 of FIG. 4.

The card reader is adapted to read the recorded information on the card during the controlled return of tray 25 to its normal position. It is provided with a plurality of transducer elements 88 which are, as is best shown in FIGS. 4 and 7, positioned in a broadside arrangement transverse to the direction of travel of tray 25. Each transducer is positioned in coincidence with a different character-representing row of a data card as inserted into the tray. Further, each transducer element 88 comprises a switching means which, in this embodiment, includes two feeler elements 89 and 89'. As tray 25 travels past, the feeler elements search for a recorded mechanical input in the data card row associated with their transducer element. Feeler elements 89 and 89' are made of conductive material and are spring biased to press against the data card so as to be physically translated upon encountering such mechanical input. Thereby, each feeler element is adapted to form the movable contact of a switching element as is shown in FIG. 2. Each feeler element is therefore electrically connected through contact means 90 and 90', to an oscillator selected in accordance with the data character represented by its transducer.

As shown in FIG. 2, contacts 91 and 91' of the transducer switching elements are connected to opposite sides of output transformer winding 75. Thus all the contacts 91, and all the contacts 91', are electrically tied together in common, respectively. In the card reader, as is best shown in FIG. 4, these contacts are provided in the form of bars of a conductive circuit arranged on the surface of tray 25. This circuit may advantageously be so arranged by conventional printed circuit techniques. The circuit bars must be substantially parallel so as to remain associated with their assigned feeler elements throughout the travel of the tray. To avoid spreading or bending of the feeler elements, thereby displacing them from their assigned position, a comb element 97, best shown in FIG. 7 is advantageously provided. All the bars 91 are connected in common through a bar 92, while all the bars 91' are connected in common through a bar 92'. Bars 92 and 92' are connected to conductive side walls 93 and 93' respectively. Electrical contact to these walls throughout the travel of the tray is maintained by spring biased conductive feelers 94 and 94', respectively. Conductive leads connecting to the appropriate sides of transformer winding 75 are connected to feelers 94 and 94' through the medium of contacts 95 and 95'. These connections are shown schematically in FIG. 2.

Figure 6:
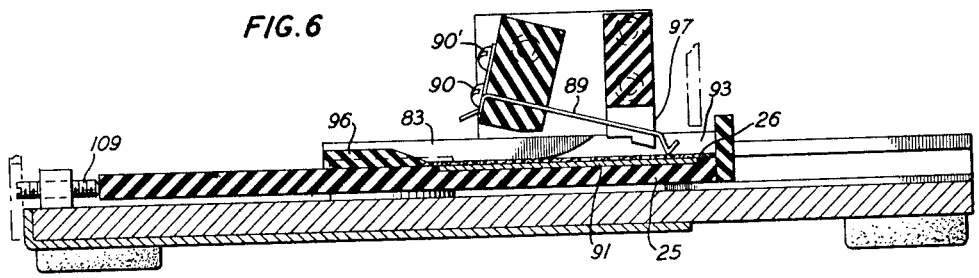
FIG. 6 is a section as in FIG. 5 with the card reader tray inserted.

The described arrangement provides for the direct and simple actuation of transducer elements 88 by the recorded mechanical inputs on a data card. The method of actuation may best be described with reference to FIGS. 5, 6 and 8. FIG. 5 illustrates the card reader with tray 25 in its normal position. At that time a wedge 96 is drawn under feeler elements 89 and 89', raising them upward against their bias within comb element 97. As is best shown in FIG. 6, tray 25 is manually translated against its governor and spring system 82, feeler elements 89 and 89' slide downwardly along the incline of wedge 96 into contact with data card 26 in the tray. The tray, when released, then returns to its normal position at a substantially constant rate of speed under the control of the governor and spring system. At this time, the feeler elements of each transducer search the assigned data card row for perforations. Unless it finds a perforation, each feeler element is insulated from its associated printed circuit bar. As shown in FIG. 8, however, each feeler element, upon encountering a perforation is biased through the perforation into contact with its assigned bar. In this way, each feeler element effects closure of the switching element which it comprises.

In order to effect the multiple closure prescribed by the invention, the switching elements of an individual transducer element, as for example feeler elements 89 and 89', and bars 91 and 91' associated therewith, respectively, are arranged in close proximity. The feeler elements of an individual transducer are thus adapted to simultaneously fall through a single data card perforation to effect the prescribed simultaneous switching closure.

As has been indicated, tray 25 is adapted to return at a substantially constant rate of speed to its normal position under the control of governor and spring system 82. In order to insure the transmission of equally and properly spaced signals, the reading of the data card is advantageously effected during this return travel. As shown in FIG. 4, a two-position, normally closed switch 98 is advantageously provided for this purpose. This switch is maintained in its open position during the manually initiated travel of tray 25, and in its closed position during the return travel of the tray by means of a lever 99 which is controlled by a gear 100. Lever 99 is pivoted around a pin 101 in a rotational direction depending upon the rotational direction of gear 100. The rotational direction of gear 100, in turn, depends upon the direction of travel of tray 25. Thus, when tray 25 is manually translated, lever 99 rotates to open switch 98. At that time, as shown schematically in FIG. 2, switch 98 disconnects the card reader from winding 75 of output transformer 74, thereby preventing signals from being applied to the telephone network. On the other hand, when tray 25 returns to its normal position under governor control, switch 98 returns to its closed position, thereby permitting transmission of signals from the card reader.

The card reader embodiment hereinbefore described is adapted to read data cards having mechanical inputs in the form of perforations. However, the principles employed may readily be adapted to read data cards upon which information is recorded in the form of embossments. An embodiment designed to read such data cards is illustrated in FIG. 10, showing in perspective a data card 110 having recorded embossments 111. Only one of the individual transducer elements 112 is shown in detail.

The transducer shown is adapted to produce a coded signal which, as before, comprises two voltages of different frequencies. In this case, transducer element 112 employs three feeler elements 113, 114 and 115. All the feeler elements are biased against data card 110. The other two elements 113 and 115 are conductive. Central element 114 is provided with two conductive bars 116 and 117. Each bar extends to either side of central feeler element 114 at least up to the adjacent outer feeler element. These bars are electrically insulated one from the other by means of an insulating section 118. In addition, the bars are disposed normally out of contact with feeler elements 113 and 115 by means of a curved portion 119 of feeler element 114. Electrical bars 116 and 117 form the movable contacts, and feeler elements 113 and and 115 the relatively stationary contacts, of the switching elements of transducer 112. The feeler elements are arranged such that only center feeler element 114 encounters an embossment during the scanning of a data card row, feeler elements 113 and 115 being spaced to pass to either side of the embossment. Thus, when feeler element 114 encounters an embossment, it is raised while the other feeler elements remain relatively fixed. In this way, bars 116 and 117 are translated into contact with their associated outer feeler elements, respectively, to effect the desired simultaneous closure of the switching elements of the transducer.

The provision of switching element contacts in the form of feeler elements 113 and 115 plays an important role in the operation of this transducer element. Often a card may be buckled or have creases and ridges therein, due to excessive use and handling. A feeler element may therefore be raised to give a faulty reading without having detected an embossment. This is avoided in accordance with the present invention by the provision of feeler elements 113 and 115, which sense such card imperfections along with central feeler element 114 and thus prevent accidental switching closure.

Other alternatives available in the card reader of the invention are shown in FIG. 11. The transducer element there illustrated reads data cards having either perforations or embossments. A feeler element 120 again is biased against a card 121. Feeler element 120 has conductive sections 122 connected to it and insulated one from the other. These sections comprise the movable contacts of the switching elements forming the transducer. A first set of relatively stationary contacts 123 is arranged above these movable contacts. Thus, when feeler element 120 is raised by encountering an embossment 124, the switching elements of the transducer are simultaneously closed as prescribed. The transducer may also be adapted to be actuated by a perforated card by means of a second set of relatively stationary contacts 125 arranged below movable contacts 122. When biased feeler element 120 encounters a perforation 126, movable contacts 122 fall against stationary contacts 125 to effect multiple closure. Both upper and lower sets of stationary contacts 123 and 125, respectively, are employed to send the same information character, and hence may be electrically connected together as shown.

The embodiment of FIG. 11 may also be employed to produce electrical signals comprising more than two frequencies to represent each character of information. A transducer employing printed circuits, as in the embodiment of FIG. 4, may prove impractical in such case, since the number of feeler elements required might not fit within the single perforation. This difficulty is eliminated by the use of a single feeler element having a multiplicity of contacts, as in FIG. 11.

Very often it is desirable to include a prescribed item, such as transmitter identification, or the like, with each message sent from a transmitter to a receiver station. The improved transmitter of the invention may readily be modified to automatically transmit such an item. A modification of this nature may take a variety of forms, a preferred form being illustrated in FIG. 12. The printed circuit of tray 25 is divided into two sections 130 and 131, the printed circuitry of section 131 remaining as before. Most of the printed circuit in section 130 is insulated advantageously by means of a spray or a layer of paper adhesively applied. Preselected portions 132 of the printed circuit, however, are left exposed, these portions being arranged in accordance with the code identifying the item which is to be automatically transmitted. In this way, recording is effected on the card reader tray itself, rather than on a data card. When the non-repeated item of the message is to be transmitted, the operator merely inserts a data card and proceeds as usual. The usable portion of the data card is, however, restricted to that portion covering section 131 of the printed circuit. The means shown in FIG. 12 has the advantage of being semi-permanent in nature. Items may readily be changed by the removal of the insulative covering from section 130 and the substitution of another pattern.

*Receiver*

The receiver of the invention is illustrated in schematic detail in FIGS. 13, 14, 15 and 16. Continuity between the circuit portions in each figure is shown in FIG. 17. Receiver circuits in FIGS. 13–16 which correspond to blocks in FIG. 1 are identically numbered.

Referring to FIG. 13, receiver line switch 30 is shown in its normal position with the receiver telephone set connected directly to the telephone line. The operator at the receiver is first notified of a transmitter station request by a telephone call. Line switch 30 is then actuated to break contact between the telephone line and telephone set and to connect the telephone line to an available receiver unit.

Connection to the receiver is made through hybrid circuit 31 which, in this embodiment, takes a form conventionally employed in telephone equipment to permit simultaneous two-way transmission over telephone lines. As indicated in the preceding General Description, bi-directional operation may advantageously be utilized in the present system in the absence of echo suppressors in the telephone line. Otherwise, hybrid circuit 31 merely acts as a two-way switch, routing inputs to the receiver from the telephone line through its transformer section 200 and routing outputs from the receiver to the telephone line through its transformer section 201.

Line relay circuit 32 is connected through hybrid circuit 31 to the telephone line. Line relay circuit 32 is activated as soon as power is applied to the receiver. At that time contacts 223 and 224 close, completing a circuit connection which maintains telephone line contact between the transmitter and receiver. In the event of power failure in the receiver, these relay contacts open to interrupt telephone contact and thus indicate receiver failure to the operator at the transmitter.

The input signals from the transmitter pass through transformer section 200 of hybrid circuit 31 into amplitude limiter circuit 33 (FIG. 14). The embodiment shown operates in push-pull fashion in a manner so well known in the art as to need no description herein. In the present system, amplitude limiter 33 functions to adjust the amplitude of the incoming signal in accordance with the requirements of the receiver circuit. Amplitude limiter 33 is therefore adapted to provide signal amplification or limiting where required. A potentiometer 203 is advantageously provided to adjust the point at which amplitude limiting occurs.

The output of amplitude limiter circuit 33 is applied to different portions of the receiver circuitry. The translation function of the receiver will first be described. In this function, the output of amplitude limiter 33 is applied through an output transformer 202 to the signal detector circuit, shown generally at 34. This circuit comprises a plurality of sharply tuned filters 204–209, corresponding in number to the number of frequencies available at the transmitter. Each filter circuit is adapted to pass at different one of the transmitter frequencies. A multi-frequency signal arriving at the receiver is thus broken up into its component A.C. voltages.

The output of each filter is applied to an associated channel circuit. Following the output of the 700 c.p.s. filter 205 (FIG. 14), for example, it is connected to the plate of a diode-connected tube-half 210. There the 700 c.p.s. voltage is rectified and applied, through a cathode output, to the control grid of an associated thyratron tube 211 to trigger the thyratron. The 900 c.p.s. voltage is applied through identical channel circuitry. In that case, the voltage is rectified through a diode 212 and applied to the control of a thyratron 213. Both of these channel circuits are shown in a single channel unit 214 as a matter of convenience, since diodes 210 and 212, in this embodiment, each comprise half of the same tube package. The remaining channel units 215 and 216, providing for filters 206–209, are identical to unit 214 and for that reason are not shown in detail.

Figure 15:
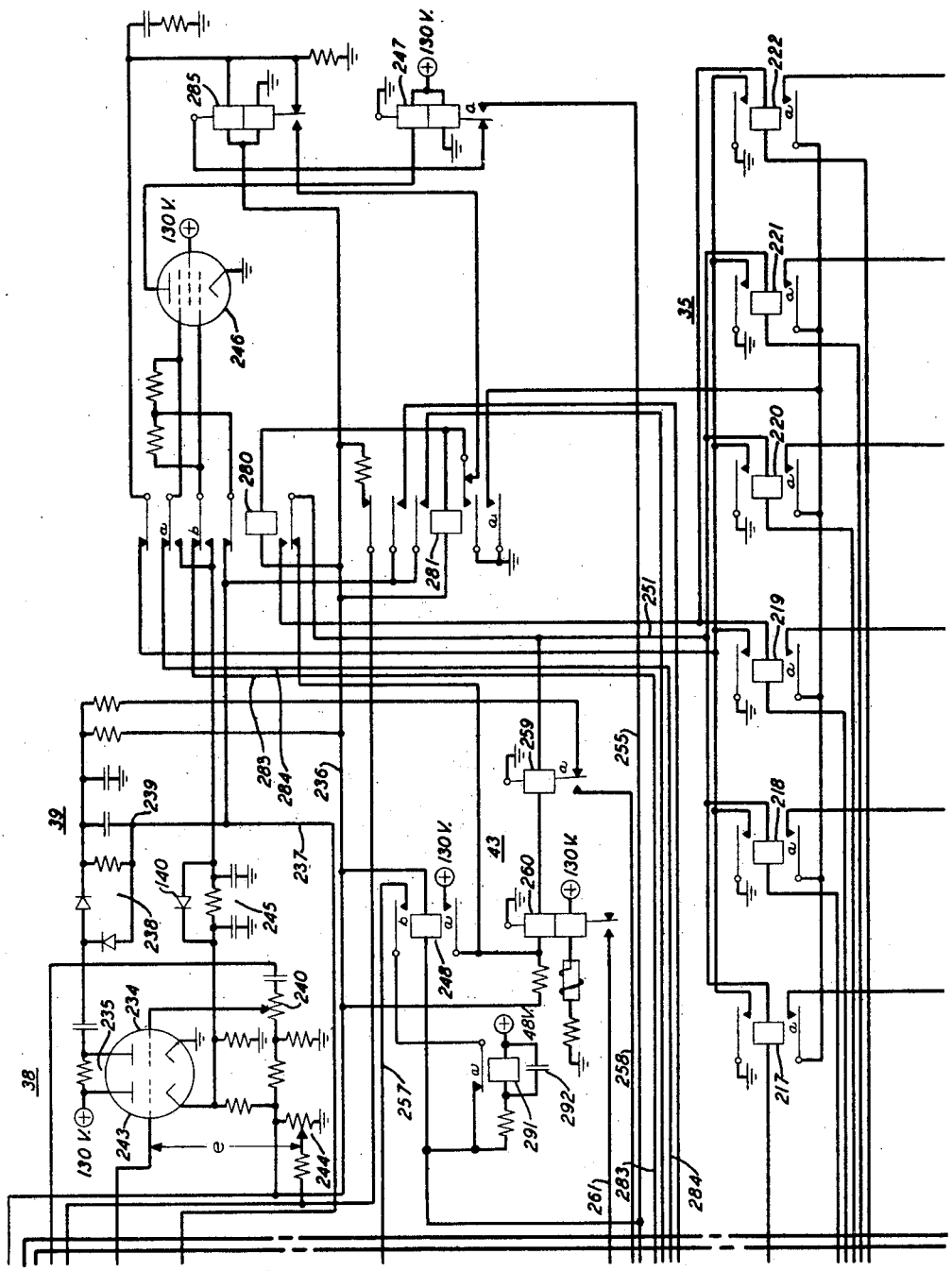

A separate relay is connected to the output plate of each of the thyratrons, as shown in FIG. 15. These relays 217–222 comprise code circuit 35 of the receiver system. Each relay is adapted to be actuated by the output of its associated thyratron. For example, an input signal having component frequencies of 700 c.p.s. and 900 c.p.s. will actuate code relay 217 through thyratron 211 and code relay 218 through thyratron 213. In this way, the code circuit produces signals indicative of the component frequencies of the input signal received.

Figure 16:
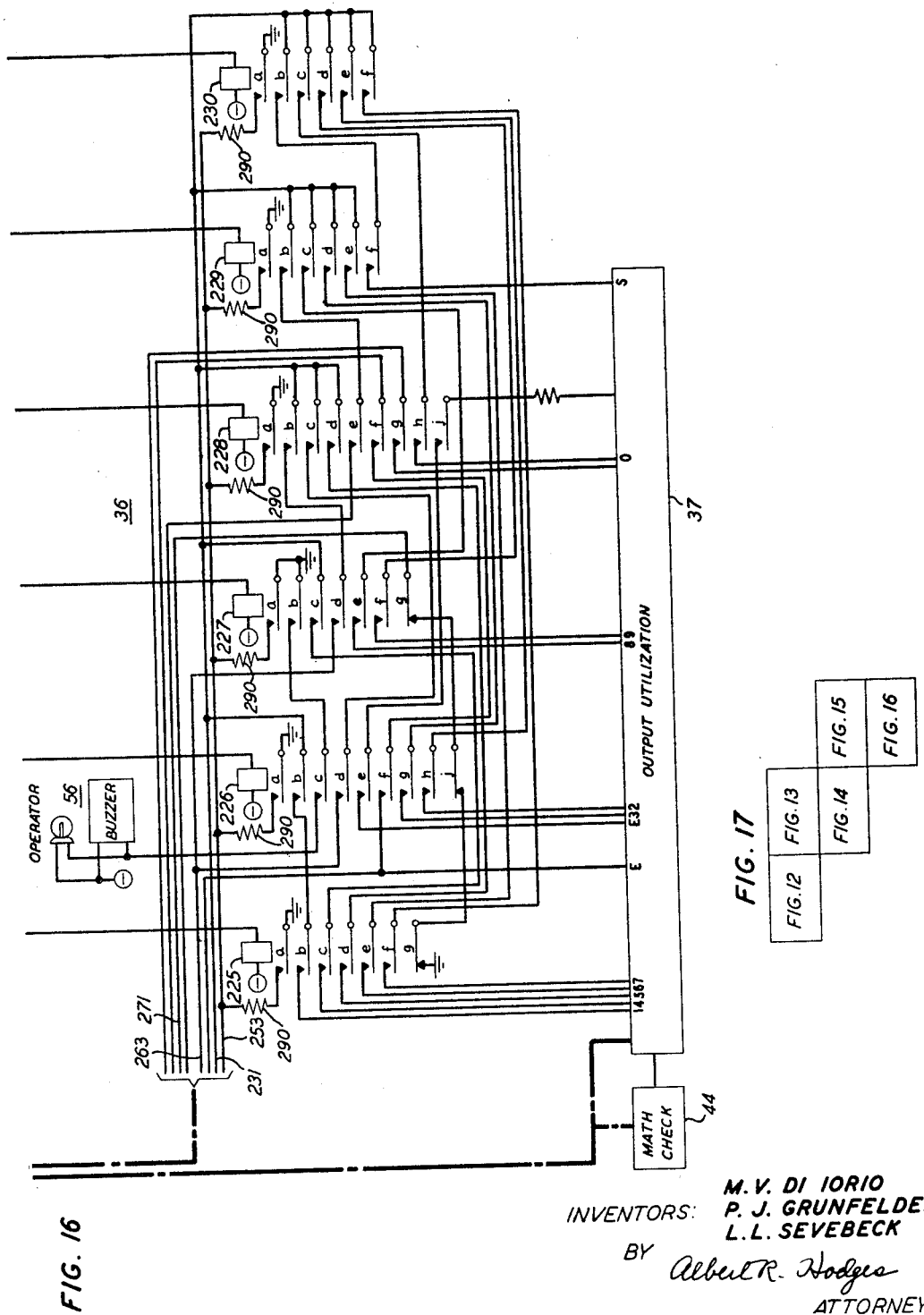

Translate circuit 36, shown in FIG. 16, is provided to identify the character represented by the now-identified component signal frequencies. Translate circuit 36 comprises a plurality of relays 225–230, corresponding in number to code relays 217–222. Each of the translate relays is connected through a contact *a* of a different one of the code relays so that the actuation of a code relay actuates the translate relay connected to it. Each translate relay is also provided with a plurality of contacts as shown. Output leads, each representative of a different one of the transmitted characters of information, connect through preselected contacts of the translate relays to output utilization unit 37. Each output lead is designed by the information character it represents.

Translate circuit 36 achieves its function by means of an interconnection of the translate relay contacts which produces a signal at an appropriate one of its output leads in response to the component frequency identification effected by the code relays. For example, a multi-frequency signal having component frequencies of 700 c.p.s. and 900 c.p.s. in actuating code relays 217 and 218 closes the contact *a* of each, these contacts in turn actuating translate relays 225 and 226 to close their contacts. A complete circuit path is thus provided from the output lead representative of the character (1), through the contact *b* of translate relays 225 and 226, to a lead 231, through normally closed contact *a* of a relay 232 (FIG. 13), and through a lead 256 to output utilization unit 37. No other of the output leads is provided with such a closed circuit path by the actuation of these two translate relays. Translate circuit 36 has therefore interpreted the input signal as being representative of the character (1), and has provided an output signal in the form of a circuit closure to output utilization unit 37 signifying that fact.

The present system incorporates a number of checks which insure the error-free processing of signal information. A first of these checks is designed to avert receiver confusion by preventing the simultaneous application of two input signals. To this end, the output of amplitude limiter circuit 33 (FIG. 14), in addition to being applied to signal detector circuit 34, is applied to signal present circuit 38 (FIG. 15). The output in this case is taken from the plate of a vacuum tube 233 and applied to the control grid of a triode 234, comprising half of a vacuum tube 235. This produces an output voltage at the plate of triode 234 which is applied to bias circuit 39. A negative potential is applied to bias circuit 39 from line switch 30 (FIG. 13) through a lead 236 to continuously apply, from the beginning of receiver operation, a negative bias to all the channel circuit thyratrons in units 214, 215 and 216, through a lead 237. This bias is not sufficient for cut off, and permits a first input signal to trigger the appropriate thyratrons, as before described. The same input signal, however, also produces an output voltage at the plate of triode 234 for as long as it is applied to the receiver. This output voltage is rectified by means of a polarized network 238 to produce a negative voltage, which is added at a common terminal 239 to the already existing bias applied to the thyratrons. By means of a potentiometer 240 this additional voltage is adjusted to produce sufficient bias to cut off the thyratrons. Signal detector circuit 34 is thus made unresponsive to succeeding input signals, whereby only one signal at a time is permitted to enter the receiver system. As soon as the first input signal has been removed, however, triode 234 ceases to produce an output, the added bias is removed, and signal detector 34 is returned to its normal receptive state.

Signal present circuit 38 also prevents the reception of spurious signals of short duration, of insufficient amplitude, or of incorrect frequency. The output of amplitude limiter 33 is first applied to a band-pass filter 241. There only voltages having frequencies within the prescribed 700–1700 c.p.s. range are permitted to pass through a transformer 242 to be applied between the control grid and cathode of a triode 243 in vacuum tube 235. Triode 243 is negatively biased, by the potential from lead 236, to rectify the voltage applied to it. Its output is therefore a D.C. potential appearing at its cathode. The setting of a potentiometer 244 determines the minimum amplitude which a voltage applied to triode 243 must have in order to produce the cathode output. The D.C. output voltage of triode 243 is then applied to a filter circuit 245. The capacitors in the filter circuit are selected so that a signal having shorter than a preselected duration will not pass. This minimum signal duration is prescribed by the time required to complete receiver operation on an input signal and may be varied to suit receiver requirements by the appropriate selection of capacitor values. Rapid discharge of the filter circuit is effected by means of a diode 140.

The output of filter circuit 245 is applied to a pentode 246 at both its control and suppressor grids. This results in current flow in the plate circuit of pentode 246, which actuates a relay 247. Relay 247, through its contact $a$, actuates a relay 148 which, in turn, connects plate voltage to the thyratrons in channel units 214, 215 and 216 (FIG. 14,) through its contact $a$ and a lead 251 connecting through code relays 217–222. Without thyratron plate voltage, code relays 217–222 cannot be actuated by the output of signal detector circuit 34. The application of thyratron plate voltage, however, requires the reception of an input signal having the proper frequency to pass through filter 241, the minimum amplitude to provide an output at triode 243, and the minimum time duration to pass through filter 245. Thus the receiver is effectively made unresponsive to spurious signals.

As has been noted, a number of leads are required to pass through the contacts of relay 232 in order to effect their respective circuit connections. Relay 232 forms part of interlock circuit 40, which functions to prevent multiple registration in output utilization unit 37. Multiple registration may, for example, take the form of multiple punching in a keypunch unit. The operation of relay 232 is made dependent upon the closure of two separate power circuits. These circuits are connected in parallel to relay 232 through potentiometers 248 and 249. Potentiometer 248 connects through a lead 253 to contact $a$ of all the translate relays (FIG. 16) so that the operation of translate circuit 36 by an input signal connects lead 253 to ground, thereby applying power through potentiometer 248 to relay 232. Potentiometer 248 is so set, however, that this power alone is not sufficient to actuate the relay. Potentiometer 249 connects through a lead 254 to output utilization unit 37 (FIG. 16). Unit 37 is adapted to connect lead 254 to ground, upon having completed the registration of an input signal to supply power to relay 232. Again this power alone is not sufficient to actuate the relay. However, the power applied through both leads 253 and 254 is sufficient for relay actuation. Upon being actuated, relay 232 switches its contact $b$ to connect a third potentiometer 252 through a lead 255 to contact $a$ of relay 247 (FIG. 15). Relay 247, it will be remembered, is actuated by signal present circuit 38. Thus contact $a$ of relay 247 remains in position to connect lead 255 to ground so long as an input signal is present in the receiver. Potentiometer 252 is so set that the power applied through lead 255 is sufficient to actuate relay 232. Relay 232 is therefore locked into position so long as an input signal is present in the system. A diode 250 is provided to prevent power flowing through potentiometers 248 and 249 from feeding back through lead 255.

In operation, relay 232 is prepared for actuation, through potentiometer 248 by input signal reception, and is actuated, through potentiometer 249, by input signal registration. Actuation of relay 232 causes its contact $a$ to open. Contact $a$ connects through lead 231 and through the signal selected output lead of translate circuit 36 to output utilization unit 37. Further, contact $a$ connects through lead 256 to output utilization unit 37. It will be remembered that output utilization unit 37 receives signal input from the selected output lead of translate circuit 36 in the form of a circuit closure passing through the normally closed contact $a$ of relay 232. The opening of contact $a$ thus serves to terminate the application of an input signal to output utilization unit 37 as soon as the registration operation therein is concluded. Multiple registration is thereby effectively prevented.

The preparation for actuation of relay 232 by the translate relays is provided in order to insure that all the component freqeuncies of an input signal are registered before contact $a$ of relay 232 is opened. This precaution is important to receiver operation since delay between component frequencies may readily be anticipated from a variety of cases, for example from a frequency-dependent delay characteristic in the circuitry of a telephone network. For that reason, the power applied through potentiometer 248 by the closing of one translate relay alone is made insufficient to prepare relay 232 for actuation through potentiometer 249. In this embodiment, since two component frequencies are employed, the closure of two translate relays representing the reception of both component frequencies is required. A means for effecting this requirement is the provision of a resistor 290 (FIG. 16) in each lead from contact $a$ of the translate relays to lead 253. Appropriate choice of the resistor values determines the number of translate relay closures required to prepare relay 232 for actuation.

After actuation, relay 232 is locked into its actuated position through potentiometer 252, by signal present circuit 38, so long as the registered signal remains in the system. This insures that its contact "a" will remain open until the registered signal is removed. The locking of relay 232 effects another function through its contact c. As previously discussed, relay 148 (FIG. 15) permits signal reception by providing plate power to the code relay thyratrons (FIG. 14) only if an input signal meeting required specifications is applied to the system. This plate power must remain on the thyratrons so long as the input signal is required by the system. Relay 148 is therefore locked into actuation through contact a of relay 291, its contact b, a lead 257, contact c of interlock relay 232, and a lead 258 which connects through contact a of a relay 259 to ground. Contact a of relay 259 is closed at this time, as will be described later. When the input signal is registered and no longer required, however, power should be removed from the thyratrons to reset signal present circuit 38 for the checking of subsequent signals. This is achieved in the interlock circuit where the registration of the input signal actuates relay 232, opening normally closed contact c and, thereby, unlocking relay 148 to drop power off the thyratrons.

Relay 148 may conceivably be actuated by a single-frequency input signal passing through signal present circuit 38. In that event, relay 148 would not be unlocked by relay 232 which is protected against spurious signal actuation by potentiometer 248. Relay 291 (FIG. 15) is provided to unlock relay 148 in this circumstance. Relay 291 is by-passed by a capacitor 292 so as to require a preselected amount of time after the application of power from relay 247 to relay 148 to actuate. The actuation of relay 291 opens its contact a which unlocks relay 148. The time required to operate relay 291 is varied by selection of the value of capacitor 292, and is determined by the maximum time normally required for registration of the input signal. With normal operation, therefore, relay 148 will have been unlocked by relay 232 prior to the actuation of relay 291. If relay 232 remains unactuated, however, relay 291 operates to unlock relay 148 for subsequent operations.

Interlock relay 232 is locked into actuation by signal present circuit 38 each time a signal enters the system, and is unlocked each time the signal is removed from the system. It may therefore advantageously be employed to indicate signal presence to the operator at the receiver. To this end, contact d of interlock relay 232 is connected to signal present lamp 41.

A further check provided by the system produces an error indication whenever an input signal comprises more or less than the specified number of component frequencies. The receiver includes the code checking circuit, shown generally at 43 in FIG. 15, which comprises two relays 259 and 260 connected in series. Code relays 217–222 are connected in parallel with this series combination through lead 251. Thus power applied to any one code relay is simultaneously applied to code check relays 259 and 260. Neither relay 259 nor relay 260 is capable of being actuated by the power supplied through one code relay alone. Relay 259 requires power from two code relays before it can be actuated, while relay 260 requires power from more than two code relays. Therefore, when a multi-frequency input signal having the specified two frequencies is received in the system, two code relays are operated and relay 259 is actuated. Relay 260, however, remains unactuated since insufficient power is applied to it. The actuation of relay 259 closes its contact a, thereby connecting lead 258 to ground. This connection permits the locking of relay 148 through its contact b, as before described.

If the input signal has less than the required number of frequencies, relay 259 remains unactuated. The system may readily be adapted to signal the occurrence of such an error. The reception of a signal having only one frequency will operate only one code relay and therefore only one relay in translate circuit 36. The translate circuit may therefore be adapted to produce the error indication. Further, because only one translate relay is operated, the circuit closure required to produce a registration in output utilization unit 37 will not be effected. In the case of a data card input, therefore, mathematical check circuit 44 (FIG. 16), as discussed in the general description, will produce a signal indicating the error. Because of its conventional nature, mathematical check circuit 44 is shown only in block diagram form in FIG. 16. On the other hand, if an input signal has more than the prescribed number of component frequencies three or more of the code relays will be actuated. This provides sufficient power to actuate relay 260. The actuation of relay 260 connects a lead 261 to ground, thereby to produce an error indication.

The error indications provided by code check circuit 43 and mathematical check circuit 44 both signal the detection of an error, but do not prevent the occurrence of the error. In the invention, the receiver is interrogated each time an item of information is registered to determine whether or not errors have been detected by these checks. The outputs of both code check circuit 43 and mathematical check circuit 44 are applied to a relay 262 in an error memory circuit 45 through lead 261 (FIG. 13). Upon the detection of an error at either check circuit, a power closure is provided actuating relay 262, which stores the error detection in the form of a contact closure. At the end of the transmission of an item, the operator at the transmitter sends a coded multi-frequency signal denoted "Item Register" to the receiver. This control signal, in the present embodiment, comprises voltages having frequencies of 1100 c.p.s. and 1300 c.p.s. These voltages actuate code relays 219 and 220, which in turn actuate translate relays 227 and 228. This provides a power closure through contact b of a relay 283, contact d of relay 227, and a lead 263 to a relay 264 of item register circuit 47 (FIG. 13).

Relay 264 effects two functions. It sends a signal through its contact a, to output utilization unit 37 indicating that a complete item has been transmitted. Output utilization unit 37 is then cleared for the reception of a subsequent item. The clearing may be automatically effected, for example by the line upspace and carriage return of a typewriter, or the card feed of a key punch. Relay 264 also sends a check signal to tone release circuit 48, indicating to that circuit that a complete item has been transmitted. This is effected by a power closure to a relay 265 through contact b of relay 264.

Tone release circuit 48 functions to transmit a signal to the transmitter through hybrid circuit 31, each time an item of information is registered, indicating whether or not an error has been detected. The actuation of relay 265 by item register circuit 47 switches its contact a, which closes a circuit path from oscillator 49 through contact a of a relay 267 to hybrid circuit 31. This sends a steady signal derived from resonant circuit 268 of oscillator 49, through transformer 201 of hybrid circuit 31 to the transmitter where it is advantageously received as an audible tone. Means may be provided to open, at this time, the circuit from hybrid transformer 200 to amplitude limiter circuit 33 in order to insure that the error signals art not fed back into the receiver.

In the convention adopted in the present embodiment, a steady signal indicates the absence of error, whereas, an easily distinguished pulsating signal is employed to indicate the detection of an error. To determine which of these signals should be sent to the transmitter, tone release circuit 48 interrogates error memory circuit 45 through the closure of contact b of relay 265. If an error indication is not stored in error memory circuit 45, relay 262 remains unactuated and its contact a remain open. In that event, closure of contact b of relay 265 does nothing.

Relay 265 merely acts as a switch, which when actuated by the item register control signal sends a steady tone through its contact a to the transmitter. On the other hand, when an error indication is stored in error memory circuit 45, relay 262 is actuated, closing its contact a. This applies a power closure through contact b of relay 265 to relay 266. Relay 266 in turn applies a power closure through its contact a to relay 267, which forms part of pulsing circuit 50. Relay 267 through the medium of a capacitor 269 is adapted to alternately open and close its contacts. As a result, its contact a alternately applies a signal from resonant circuit 268 and from a resonant circuit 270 through contact a of relay 265 to the line. Resonant circuit 268 is tuned to a frequency differing from that of resonant circuit 270 so that a pulsed signal is applied to the transmitter in the event of an error detection. The pulsed error signal lasts for an extended period of time by the switching of an additional capacitor 274 through contact b of a relay 266 to increase the holding time of relay 265.

The transmitter is also adapted to send a multi-frequency control signal designated "Message End" to the receiver. This control signal indicates that a complete message has been transmitted and affects the receiver accordingly. By means of its component frequencies of 1300 c.p.s. and 1500 c.p.s., the message end control signal actuates translate relays 228 and 229. A power closure through contact b of relay 229, contact e of relay 228, and a lead 271 to a relay 272 of message end circuit 52 is thus provided. The actuation of relay 272 closes its contact a, which provides a power closure for relay 264 of item register circuit 47. The message end control signal, therefore, effects the same functions as does the item register control signal. Further, however, the message end control signal closes contact b of a relay 272, which actuates a lock relay 273, closing its contact a and energizing message end lamp 53. The receiver operator is thereby notified that the transmitter has completed its message and that the receiver may therefore be disconnected from the telephone line.

The transmitter is further adapted to send a multi-frequency control signal designated "Error" to the receiver. This control signal is sent by the operator at the transmitter upon his realization that an error has been committed by himself, in entering data into the transmitter. The control signal comprises frequencies of 900 c.p.s. and 1300 c.p.s. and therefore actuates relays 226 and 228 of translate circuit 36. This effects a circuit closure through contact j of relay 228 and contact e of relay 226, whereby output utilization unit 37 is cleared of all prior characters registered therein to prepare it for the repetition of the item. Further, circuit closure is effected through contact f of relay 228 and contact f of relay 226, in order to send an error indication to error memory circuit 45.

The transmitter is also adapted to send a multi-frequency control signal designated "Operator" to attract the attention of the operator at the receiver. Component frequencies of 900 c.p.s. and 1100 c.p.s. are employed, thereby actuating relays 226 and 227 of translate circuit 36. This effects a power closure, through contact b of relay 227 and contact c of relay 226, which energizes light and buzzer unit 56 adapted to attract the operator's attention.

A final multi-frequency control signal, which has been found useful in the present system, is designated "Message Start." This control signal is employed to prepare the receiver for the reception of signals. Prior to such preparation, the receiver is conditioned so as to be unresponsive to spurious signals. The conditioning is accomplished by means of relays 280 and 281, shown in FIG. 15. For example, in its unactuated position, relay 281, by means of its contact a, prevents the operation of translate circuit 36. Contact a is normally open, thereby preventing the code relays from providing power closure to the translate relays. Further, relay 280, by means of its normally open contacts a and b, prevents the application of voltages to the suppressor grid and control grid of pentode 246. Thus relay 148 cannot be actuated to provide power to the code circuit thyratrons. The transmitter operator sends the "Message Start" control signal to the receiver only at the actual moment that he desires to send data information, the control signal being adapted to actuate relays 280 and 281. In this case, the component frequencies of the control signal are 1100 c.p.s. and 1700 c.p.s. The 1100 c.p.s. voltage is applied through filter 207 of signal detector circuit 34 (FIG. 14), to the diode rectifier in the channel circuit associated therewith, to produce an output voltage at a lead 283. Lead 283 connects through normally closed contact b of relay 280 to the control grid of pentode 246. The 1700 c.p.s. voltage is applied through filter 208 to the diode rectifier associated therewith to produce an output at a lead 284. Lead 284 connects through normally closed contact a of relay 280 to the suppressor grid of pentode 246. With these two voltages applied to its control and suppressor grids, pentode 246 conducts and actuates relay 247. Relay 247 in turn actuates relay 245, which finally actuates the relays 280 and 281, thereby preparing the receiver for signal reception.

Modified Transmitter

FIGS. 18, 19 and 20 illustrate a transmitter unit 300 alternative to that of FIG. 2 which, though arranged in accordance with the basic principles of the invention, provides various advantageous aspects. Transmitter 300 is broadly divided into an oscillator circuit 301 and a data input translator 302. The oscillator circuit, as before, provides a plurality of A.C. voltages of different frequencies for the production of multi-frequency signals. The translator, as before, incorporates the transducing means whereby data information and control commands are inserted into the data processing system.

Oscillator circuit 301 is similar to apparatus disclosed and claimed in copending application Serial No. 759,474 filed September 8, 1958, by L. A. Meacham and F. West, and assigned to Bell Telephone Laboratories, Incorporated. The power requirement of this oscillator circuit is extremely small and may, in fact, be satisfied by the relatively small amount of power ordinarily available through a telephone subscriber line. Oscillator circuit 301 may therefore obtain its total power requirement merely by being connected to the telephone set 303 employed to establish contact between the transmitter and receiver units of the data processing system.

A preferred power connection for transmitter 300 is shown in FIG. 18. Power leads 304 from the transmitter are connected through a conventional telephone terminal board 305 to one side of the handset-operated switch hook 306 of telephone set 303. The other side of switch hook 306 is connected through terminal board 305 to the telephone line 307. Thus, when the operator at the transmitter establishes telephone contact with a receiver station, the lifting of telephone handset 349 closes switch hook 306 to automatically apply power from telephone line 307 to oscillator circuit 301. Advantageously, a telephone set having an exclusion switch 308 is employed. This enables the operator to disconnect handset 349 from the telephone line after establishing a talking circuit contact with the receiver. Spurious signal generated at the handset are thereby prevented from entering the system during transmitter operation.

For a detailed description of the theoretical operation of oscillator circuit 301, reference may be made to the above-cited copending application. In general, oscillator circuit 301 comprises a pair of resonant circuit means 309 and 310, which are electromagnetically coupled to an amplifier having a transistor 311 as its active element. Transistor 311 has its base electrode 312 connected through a pair of series windings 313 and 314 to one side of a diode 315. Its emitter electrode 316 is connected through an emitter resistor 317 and a pair of series windings 318 and 319 to the opposite side of diode 315 and to one of the power leads 304. Its collector electrode 320 is connected through a resistor 321 and a Zener diode 322 to the other of the power leads 304. A pair of series resistors 324 and 325 are connected between collector electrode 320 and diode 315 to form a load in parallel with telephone line 307.

With these connections, power is applied from telephone line 307 to transistor amplifier 311. A bridge 323 of a well-known type is connected in power leads 304 to insure that the D.C. power applied to oscillator circuit 301 is always of the correct polarity. Emitter bias for the transistor is obtained from the voltage drop across diode 315. The output load of the oscillator circuit comprises series resistors 324 and 325 and telephone line 307. Further, the series connection through windings 313 and 314, diode 315, and windings 319 and 318 provides positive feedback between emitter electrode 316 and base electrode 312 to sustain oscillations in the circuit.

The frequencies at which these oscillations are sustained is determined by the two resonant circuit means 309 and 310. Resonant circuit means 309 is inductively coupled to the feedback circuit path of transistor amplifier 311 through windings 313 and 318. Resonant circuit means 310 is inductively coupled thereto through windings 314 and 319. This coupling of two resonant circuit means to the feedback path causes the device to simultaneously oscillate at two frequencies, thereby to produce a multi-frequency signal across its output load.

Oscillator circuit 301 differs from the oscillator circuit described in the above-cited copending application in aspects which particularly adapt it for use in the system of the present invention. Varistors 326 and 327 are provided and connected to shunt windings 314 and 328. These varistors act as non-linear elements which operate as gain controls in the same manner as do diodes 84 and 87 in FIG. 1 of the copending application. They are associated with different inductive windings in oscillator circuit 301 in order to obtain improved operation at the frequencies employed. In addition, a tap is provided in inductive winding 319 and connected through a resistor 340 to emitter electrode 316, whereby the operation of one of the resonant circuit means is not disturbed by the coincidental operation of the other resonant circuit means.

Further, each of the resonant circuit means 309 and 310 in oscillator 301 is provided with a plurality of normally open resonant circuit paths, each path having a different operating frequency. Each plurality of resonant circuit paths is formed by an inductive element means and a capacitive element means, wherein at least one of the means makes available a plurality of preselected element values. In the embodiment shown in FIG. 18, resonant circuit means 309 comprises an inductor 328 and a capacitor 329, while resonant circuit means 310 comprises an inductor 330 and a capacitor 331. Each of the inductors is tapped at preselected inductive values to provide a plurality of terminals. The capacitors are connected to a common terminal 336.

To facilitate description of the operation of oscillator 301 in transmitter 300, it shall again be assumed that the transmitter employs a two-out-of-six frequency code, and that the six frequencies are denoted by the letters C, D, E, F, G and H. In oscillator circuit 301, A.C. voltages at these frequencies are made available by the proper selection of inductor and capacitor values in resonant circuit means 309 and 310, taken in conjunction with the tapping of inductors 328 and 330 at appropriate points. Resonant circuit means 309 is therefore adapted to provide five normally open resonant circuit paths having respectively resonant frequencies of D, E, F, G and H, and resonant circuit means 310 is adapted to provide five normally open resonant circuit paths having respectively resonant frequencies of C, D, E, F and G.

Oscillator circuit 301 permits the use of transducer means in data input translator 302 which operate as do the transducer means in data input translator 21 of FIG. 2; that is, transducer means which, through coincidental multiple switching closure, directly effect the simultaneous selection, combination and transmission of A.C. voltages of different frequencies to produce a coded multi-frequency signal. Data input translator 302 therefore includes transducer means in the form of digit keys 332, control keys 333, and card readers 334 and 335, which are similar to the transducer means of translator 21. The transducer means of FIG. 18 differ, however, in one important respect which derives from an advantageous aspect of oscillator circuit 301, namely, the provision of a single common terminal 336. This permits one contact of each of the switching elements in a transducer element to be connected in common. For example, in transducer element 337 the movable contacts of switching elements 338 and 339 are connected in common.

The other contacts of the switching elements in a transducer element are, as before, connected to directly effect the coincidental circuit closure of a preselected plurality of A.C. voltage generating circuits to produce a coded multi-frequency signal. With oscillator 301, this requires that they be connected to effect the coincidental closure of a preselected one of the normally open resonant circuit paths in each resonant circuit means. In transducer element 337, for example, this is accomplished by connecting the contact in switching element 338 to terminal C in resonant circuit means 310, while connecting the contact in switching element 339 to terminal D in resonant circuit means 309. In this way, actuation of transducer 337 produces in resonant circuit means 309 a circuit closure of terminal D to common terminal 336 to form a tank circuit having a resonant frequency D, and a coincidental circuit closure in resonant circuit means 310 of terminal C to common terminal 336 to form a tank circuit having a resonant frequency C. This causes oscillator circuit 301 to produce two A.C. voltages having respectively the frequencies C and D, which are combined to form the desired multi-frequency output signal. It will readily be seen that transmitter 300 is capable of producing with the means provided any of the multi-frequency combinations available in a two-out-of-six code.

In a particular embodiment of oscillator 301, which was specifically designed and successfully operated to produce multi-frequency output signals from available frequencies of 700, 900, 1100, 1300, 1500 and 1700 cycles per second, the following values of constants and components were utilized:

| | |
|---|---|
| Transistor 311 | General Electric 2N43. |
| Inductive winding 313, turns of #36 wire | 82. |
| Inductive winding 318, turns of #36 wire | 41. |
| Inductive windings 328 and 330, turns of #36 wire | 941. |
| Inductive windings 314 and 319, turns of #36 wire | 98. |
| Capacitor 329, microfarads | 0.047. |
| Capacitor 331, microfarads | 0.082. |
| Resistors 317 and 340, ohms | 100. |
| Resistors 324 and 321, ohms | 220. |
| Resistor 325, ohms | 600. |
| Varistors 326, 327, 315 | Bell Telephone Laboratories 2052. |
| Diodes 323 | General Electric KS1512. |
| Diode 322 | 1N749. |

An alternative pair of resonant circuit means which may be utilized in oscillator circuit 301 is illustrated in FIG. 19. Each resonant circuit means again comprises an inductive element means and an associated capacitive element means. In this case, however, these inductive element means each comprise a separate inductor connected to a common terminal 341. The capacitive element means, on the other hand, each comprise a plurality of capacitors of different values connected to make available for selection a plurality of normally open resonant circuit paths in each resonant circuit means. The common terminal and the plurality of capacitor terminals are connected to the appropriate contacts of the transducer means to complete the circuit.

As shown in FIG. 20, data input translator 302 is provided in a physical form which differs in certain respects from that of data input translator 21 in FIG. 3. One such difference results from the very small size of oscillator circuit 301. This permits the oscillator circuit to be packaged within a casing which, in an experimental embodiment, is no larger than a package of cigarettes. As a result, oscillator unit 301 may be plugged directly into translator unit 302, as shown in FIG. 21, to bring the plurality of different frequency terminals and the common terminal of the resonant circuit means into the translator unit.

Translator unit 302 also includes within its housing a loud-speaker 342 for the presentation to the transmitter operator of audible tones such as, for example, error signals from the receiver. Speaker 342 thus operates in this function as does the handset of telephone 12 in transmitter 10. This permits telephone set 303 to be removed from telephone line 307 by exclusion switch 308 to provide protection against spurious signals, as previously described. A block diagram of the speaker assembly is shown in FIG. 18. Regulated voltage is applied to the speaker from across diode 322. The signals applied to the speaker are developed across resistor 324 and are then passed through an amplifier 343 having a gain or volume control 344. Volume control 344 regulates the amplifier output so that the volume at speaker 342 may be varied in accordance with the desires of the operator.

In this form, transmitter 300 may be very simply connected to a standard telephone subscriber unit for operation. Since no external power is needed, cable 345 leading from oscillator circuit 301 and containing power leads 304 need only be connected to a standard wall terminal board, as shown in FIG. 18.

Reference will now be made to FIGS. 22 through 26, wherein various advantageous mechanical aspects of transmitter 300 are shown. FIG. 22 is a plan view of data input translator 302 with part of its housing cut away to show the card reader unit. The card reader unit here employed is in many respects similar to that illustrated in FIG. 4. It includes a movable carrier member 350 adapted to be manually translated in one direction and to return in the opposite direction under the control of a governor and spring assembly 351. Governor and spring assembly 351 may be of the same type described and shown in FIG. 4. Stops 352 and 353 to limit the travel of member 350 are also provided. Further, reading is effected by arrays of feeler elements which search the face of a data card carried by the carrier member.

A first difference lies in the provision of two card reader sections 334 and 335. Carrier member 350 now includes two tray-like surfaces 354 and 355 for the accommodation of data cards. Surfaces 354 and 355 are longitudinally displaced one from the other in the direction of travel of member 350. Each of surfaces 354 and 355 has a separate array of feeler elements, 356 and 357, respectively, associated with it. As may be seen in FIG. 18, both arrays of feeler elements are electrically connected to produce signals representative of the same data characters.

Different functions, however, are assigned to the different card reader sections. Section 334 is utilized to automatically produce signals identifying the transmitter unit each time the card reader unit is operated. To this end, an identification data card 358 is inserted into section 334. This card may be maintained in section 334 so long as transmitter 300 retains the same identification code. Ready access to card 358 is therefore not needed and, in fact, is undesirable. Thus, as shown in FIG. 20, section 334 is concealed within the housing of input translator 302 throughout its range of travel. Access to section 334, in the event replacement is desired, should be provided by means of, for example, appropriate sectioning of the housing. Section 335, on the other hand, is utilized for data transmission. This requires ready access to section 335 so that data cards, such as an order card 359, may readily be inserted and replaced. As shown in FIG. 20, section 335 is therefore exposed in its normal position. With this two-section arrangement, manual translation of member 350 simultaneously moves both surfaces 354 and 355 relative to their associated arrays of feeler elements 356 and 357. Signals representative of an item of information and signals identifying the source of that item are, thereby, sent to the receiver unit with each operation of the card reader unit. Necessarily, means must be provided to prevent simultaneous transmission of the two sets of signals. This may be accomplished by offsetting feeler element arrays 356 and 357 such that one card is read before the other, or by recording on different relative portions of cards 358 and 359. The latter means is employed in FIG. 22, for example, wherein recording is confined to the rear portion of card 358 and to the forward portion of the card 359.

In FIG. 20, it will be noted that member 350 is inclined relative to the base of data input translator 302. This facilitates insertion and replacement of card 359, and additionally presents the face of the card to the operator for ready discernment. Governor and spring assembly 351 may then be positioned underneath member 350, as shown in FIG. 22.

Carrier member 350 also differs from carrier member 25 in FIG. 4 in that sections 334 and 335 each have a continuous, conductive, card-accommodating surface 354 and 355, respectively, instead of the conductive bar pairs 91 and 91'. This follows from the electrical connections shown in FIG. 18, which results from the provision of a single common terminal 336 in oscillator 301.

In another aspect of the invention, means are provided to increase the time duration of each signal produced by perforated data cards without sacrifice in speed of operation. This results in greater accuracy and ease of operation at the receiver and eliminates reliance upon the relatively sensitive, complex and expensive receiver equipment otherwise required to read signals of inadequate duration.

In accordance with this aspect of the invention, the card-accommodating surface of a card reader is provided with a plurality of embossments. As shown in FIG. 22, these embossments are positioned to coincide with all the possible locations of perforations in a data card when it is properly seated in the card reader. Each embossment is adapted to fit within a perforation, advantageously by being made similar in shape and slightly smaller in size compared with a perforation. As shown in FIG. 23, each embossment 369 preferably has its sides sloping inwardly from its base.

The manner in which the embossments operate to extend signal duration is best illustrated in FIG. 23. In reading a data card 361, a biased feeler element 362 presses against the card in search for perforations. The feeler element thus tends to depress the flexible data card as it passes between embossments. Such depression is actually accomplished, however, only when the feeler element approaches a perforation as the perforation tends to settle down about the underlying embossment. This effectively gives the feeler element advance warning that a perforation is forthcoming, thus materially increasing the duration of its switching closure.

Thus, as shown in FIG. 23, feeler element 362 slides down a depressed sloping portion of card 361 into substantially immediate contact with embossment 360 as soon as a perforation is encountered. In this way, feeler element 362 contacts substantially a total surface path of embossment 360. This results in an extended output signal duration due to the lengthened contact between the feeler element and the tray surface. Without the embossments, no advance warning is given, so that a relatively longer time transpires before a feeler element falls into contact with the tray surface. This may result in a substantial portion of the perforation passing before the feeler element is biased into switching contact, thus providing a substantially shorter signal duration.

A further aspect of the invention is an arrangement adapted to prevent operation of the card reader unit during manual translation of member 350 and to permit such operation when member 350 is returned to its normal position under governor and spring control. As shown in FIG. 18, electrical contact of the transducer elements of card reader sections 334 and 335 to oscillator circuit 301 is effected through conductive feeler elements 363 and 364 which ride on a conductive reference member 365 of movable member 350. The arrangement provided causes feeler elements 363 and 364 to be raised against their bias when member 350 is manually translated, thereby to break contact with oscillator circuit 301.

As shown in FIGS. 24, 25 and 26, this is effected by means of a wedging element 366 trapped between a first portion 367 and a second portion 368 of, for example, feeler element 363. In this embodiment, wedging element 366 takes the form of a cylindrical roller which contacts the surface of reference member 365. Preferably, axially separated, peripheral grooves 369 and 370 are provided in cylindrical element 366. Feeler element 363 is inserted into groove 369, while a spring element 371 is inserted into groove 370. The bias of spring element 371 is adjusted so as to cause cylindrical element 366 to frictionally engage and roll with reference member 365. Thus, when movable member 350 is manually translated, cylindrical element 366 tends to roll against portion 367 of feeler element 363. Portion 367 is sloped so as to cause the cylindrical element to wedge itself between the feeler element and reference member 365. As shown in FIG. 24, this causes feeler element 363 to be raised against its bias and away from reference member 365, thereby to break electrical contact between the card reader and oscillator 301.

In the opposite, governor-controlled direction of travel, it is desired to maintain electrical contact between feeler element 363 and reference member 365 in order to permit card reader operation. As shown in FIG. 25, the movement of reference member 365 in this opposite direction causes element 366 to roll against portion 368 of feeler element 363. Portion 368 is sloped so as to prevent any wedging action and merely acts to restrain the movement of element 366. In this way, feeler element 363 is biased back into contact with reference member 365 to reconnect the card readers to oscillator circuit 301. The arrangement provided replaces in function switch 98 of FIG. 4 with advantages in compactness and economy. It may equally well be employed with feeler elements 94 and 94' of that figure.

FIG. 27 illustrates a transducer element 372 which is a modification of that shown in FIG. 10 and especially adapted to cooperate with oscillator circuit 301. Transducer element 372 is employed to read embossed data cards and, to that end, comprises three conductive feeler elements 373, 374, and 375. Center feeler element 374 is connected to common terminal 336 of oscillator circuit 301, while feeler elements 373 and 375 are connected respectively to a selected frequency terminal in a different one of resonant circuit means 309 and 310. The encounter of center feeler element 374 with an embossment thereby raises the center feeler element into contact with feeler elements 373 and 375, causing the desired coincidental resonant path circuit closure. If desired, transducer 372 may be adapted to read indentations or perforations in a data card by positioning the contact portions of feeler elements 373 and 375 below rather than above center feeler element 374.

OPERATION OF SYSTEM AS A WHOLE

To provide a better understanding of the invention, a typical operation from input to output will now be described with reference principally to FIG. 1. An example shall be used in which a station having a transmitter 10 wishes to place an order for 200 pieces of item "A" and 100 pieces of item "B" with a central warehouse having a receiver 11. To initiate this order, the operator at the station first telephones the warehouse to indicate, either orally to a human operator or by a dialing code to a PBX, that an order is to be transmitted. The operator or PBX at the warehouse then switches an available receiver unit 11 onto the talking circuit established.

The remainder of the ordering operation is completely within the control of the operator at the transmitter. With the embodiment of FIG. 18, the operator disconnects his handset 349 from the telephone line by operating exclusion switch 306. Should he wish to re-establish telephone contact with the receiver, he need only close the exclusion switch and actuate the control key marked "Operator." Referring again to FIG. 1, the operator then actuates pushbutton 57 entitled "Message Start." This sends an appropriately coded signal to receiver 11 which readies it for its receiving function. A data card coded to identify the operator is then inserted into the tray of card reader 17. The tray is physically translated past transducer elements which are sequentially actuated by the card. In this way, the transducer elements in conjunction with oscillator 15 send coded multi-frequency signals corresponding to the data card code in spaced time relationship over the telephone line to the receiver 11.

Receiver 11 operates upon these multi-frequency signals as they are received by identifying their component frequencies in signal detector 34 and code circuit 35. The identified frequencies are then decoded in translate circuit 36 and the code itself registered in output utilization unit 37. In this example, output utilization unit 37 takes the form of a conventional card punch unit. The code is, therefore, registered in the form of perforations in an output data card. Checks are continuously being made during the entire transmission and reception process to insure an error-free resultant in output utilization unit 37. A number of these checks prevent error, while others detect accomplished errors and store a record of such detection.

After having identified himself, the operator at the transmitter removes his identification card from the card reader. He then replaces it with a data card selected from the files of the sending station and identified as being representative of the item "A." The operation just described is then repeated, whereby another set of coded perforations corresponding to item "A" is punched in the output data card.

The quantity (200) of item "A" desired now remains to be recorded in the output data card. This is achieved through keyboard digit 16 by actuation of the appropriate push buttons. In this case, pushbuttons 2, 0 and 0 are actuated in that order to transmit correspondingly coded signals over the telephone line to receiver 11. There, they are decoded as before and registered as perforations in the output data card. In addition to identifying the transmitter operator, it may be desirable, also, to identify the sending transmitter unit to the receiver. In the two section card reader embodiment of FIG. 22 transmitter identification is automatically sent to the receiver along with the information derived from an input data card. In the embodiment of FIG. 12, the card reader must be separately actuated without an input data card inserted to send such identification.

The output data card has now recorded on it all the information required for expediting the order relating to item "A." The operator at the transmitter therefore actuates pushbutton 46 entitled "Item Register," which sends an appropriately coded signal to receiver 11. This signal triggers output utilization unit 37, causing the completed output data card to be replaced by an unused data card ready for the reception of another item of information. Further, the item register signal causes the error detection system within the receiver to be interrogated for stored error indications. This interrogation produces a signal at the receiver which is sent to the transmitter and received there as an audible tone. A wavering tone indicates to the transmitter operator that an error has been detected at the receiver and that repetition of the item is required. A steady tone, on the other hand, indicates to the transmitter operator that error-free transmission and reception has occurred and that a subsequent item may be transmitted. The transmitter operator, upon realizing that he has committed an error in transmission, may also replace an output data card without actuating pushbutton 46 by the actuation of pushbutton 54 denoted "Error."

In the assumed example, a second order of 100 pieces of item "B" is desired. Except for the substitution of a different input data card and the insertion of a different quantity through keyboard digit 16, the operator repeats the procedure before outlined. After completing the transmission of a total order, the operator actuates pushbutton 51 entitled "Message End." This sends a signal to the receiver which informs either the operator or the PBX that transmission has been completed. The receiver is then removed from the telephone line and is made available for the reception of orders from other stations. The completed output data cards, which together comprise a total order from the transmitter, may then be employed to expedite the order in the warehouse by means of further well-known data processing techniques.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A system for processing data over a telephone network by means of multi-frequency signals each being coded to represent an individual character of said data and comprising a distinct plurality of simultaneously transmitted A.C. frequency signals, which comprises oscillator circuitry including a plurality of separate resonant circuit means and adapted to produce a multi-frequency output signal from a combination of separate A.C. voltages derived respectively from said resonant circuit means, said oscillator circuitry including electrical connections adapted to apply said multi-frequency output signal to said telephone network, each said resonant circuit means including a plurality of normally open resonant circuit paths each of which has a different operating frequency, and a plurality of individual transducer elements each corresponding to a preselected one of said characters and each including switching means actuable in response to a mechanical input to directly effect the coincidental closure of a preselected one of said resonant circuit paths in each said resonant circuit means and the application of the resultant separate voltages to said telephone network, whereby actuation of said switching means effects the simultaneous selection, combination and transmission of said separate voltages comprising one of said coded multi-frequency signals.

2. A system in accordance with claim 1, in which said plurality of resonant circuit paths in each said resonant circuit means includes associated inductive element means and capacitive element means, and means for making available a plurality of preselected element values of at least one of said associated inductive and capacitive element means.

3. A system in accordance with claim 1, in which said plurality of resonant circuit paths in each said resonant circuit means includes a capacitive element and an inductive element tapped at preselected inductive values.

4. A system for processing data over a telephone network by means of multi-frequency signals each being coded to represent an individual character of said data and comprising a distinct combination of simultaneously transmitted A.C. frequency signals, which comprises oscillator circuitry including a plurality of separate resonant circuit means and adapted to produce a multi-frequency output signal from a combination of separate A.C. voltages derived respectively from said resonant circuit means, said oscillator circuitry including electrical connections adapted to apply said multi-frequency output signal to said telephone network, each of said resonant circuit means including a plurality of normally open resonant circuit paths each of which has a different operating frequency, each said plurality of resonant circuit paths including inductive element means and capacitive element means, one of said element means making available a plurality of terminals at different preselected element values and the other of said element means being connected to a common terminal, and a plurality of individual transducer elements each corresponding to a preselected one of said characters and each including a plurality of two-contact switching elements actuable coincidentally in response to a mechanical input, one contact of each said switching element being connected to said common terminal and the other contact of each said switching element being connected to a preselected one of said plurality of terminals in a different one of said resonant circuit means, respectively, whereby actuation of each said plurality of switching elements effects the simultaneous selection, combination and transmission of said separate voltages comprising one of said coded multi-frequency signals.

5. A system in accordance with claim 4, in which said plurality of resonant circuit paths in each said resonant circuit means includes a capacitive element connected to said common terminal and an inductive element tapped at preselected inductive values to make available said plurality of terminals.

6. A system for processing data over a telephone network by means of multi-frequency signals each comprising a distinct plurality of simultaneously transmitted A.C. frequency signals, each of said multi-frequency signals being coded to represent an individual character of said data, said system including an arrangement for producing said multi-frequency signals in response to character-representing mechanical inputs in the form of perforations in a card-like insulator in accordance with a preselected code, which comprises oscillator circuitry including a plurality of separate resonant circuit means and adapted to produce a multi-frequency output signal from a combination of separate A.C. voltages derived respectively from said resonant circuit means, said oscillator circuitry including electrical connections adapted to apply said multi-frequency output signal to said telephone network, each said resonant circuit means including a plurality of normally open resonant circuit paths each of which has a different operating frequency, each said plurality of resonant circuit paths including inductive element means and capacitive element means, one of said element means making available a plurality of terminals at different preselected element values and the other of said element means being connected to a common terminal, and a plurality of individual transducer elements each corresponding to a preselected one of said characters and each including a plurality of conductive feeler elements, a carrier member having a conductive surface adapted to receive said insulator thereon and arranged to position the face of said insulator in physical contact with said feeler elements, a plurality of two-contact switching elements each including said conductive surface connected to said common terminal and a different one of said feeler elements connected to a preselected one of said plurality of terminals in a different one of said resonant circuit means, respectively, means for moving said carrier member relative to said feeler elements and means for biasing said feeler elements against said insulator thereby to physically translate said feeler elements into contact with the conductive surface of said carrier member upon the encountering of a said perforation in said insulator to coincidentally actuate said switching elements, whereby actuation of each said plurality of switching elements effects the simultaneous selection, combination and transmission of said separate voltages comprising one of said coded multi-frequency signals.

7. A system in accordance with claim 6, in which said conductive surface of said carrier member is substantially continuous.

8. A system in accordance with claim 6, in which said plurality of resonant circuit paths in each said resonant circuit means includes a capacitive element connected to said common terminal and an inductive element tapped at preselected inductive values to make available said plurality of terminals.

9. A data transmitter for providing coded multi-frequency signals each comprising a distinct combination of simultaneously transmitted A.C. frequency signals in response to perforations recorded in a perforated data card, which comprises oscillator circuitry including a plurality of separate resonant circuit means and adapted to produce a multi-frequency output signal from a combination of separate A.C. voltages derived respectively from said resonant circuit means, each of said resonant circuit means including a plurality of normally open resonant circuit paths each of which has a different operating frequency, each said plurality of resonant circuit paths including inductive element means and capacitive element means, one of said elment means making available a plurality of terminals at different preselected element values and the other of said element means being connected to a common terminal, and a plurality of individual transducer elements each corresponding to a different one of said coded multi-frequency signals and each including a plurality of conductive feeler elements and a conductive bar adapted to be normally separated by said perforated data card but to contact each other in coincidence through the same perforation in said insulator, a different one of said feeler elements being connected to a preselected one of said plurality of terminals in a different one of said resonant circuit means, respectively, and said conductive bar being connected to said common treminal.

10. A data transmitter for producing coded multi-frequency signals, each including a distinct combination of simultaneously transmitted A.C. frequency signals in response to mechanical inputs recorded on the face of a perforated data card, which comprises oscillator circuitry including a plurality of separate resonant circuit means and adapted to produce a multi-frequency output signal from a combination of separate A.C. voltages derived respectively from said resonant circuit means, each of said resonant circuit means including a plurality of normally open resonant circuit paths each of which has a different operating frequency, and a plurality of individual transducer elements each corresponding to a different one of said coded multi-frequency signals and each including at least two individual feeler elements, switching means including said feeler elements electrically connected to effect the coincidental closure of a preselected one of said resonant circuit paths in each said resonant circuit means, means for positioning the face of a said perforated data card in physical contact with said feeler elements, means for biasing said feeler elements against said perforated data card, and means for effecting relative movement between said feeler elements and said perforated data card, said feeler elements being arranged so that only one feeler element at a time encounters a said mechanical input recoded on said perforated data card, said one feeler element being arranged to be physically translated by said mechanical input into contact with the other relatively stationary feeler element to actuate said switching means.

11. A transducer responsive to perforations in a perforated data card, which comprises a feeler means, a carrier member having a surface adapted to receive said perforated data card thereon and arranged to position the face of said perforated data card in physical contact with said feeler means, said surface having a plurality of embossments positioned to coincide with all possible locations of perforations in said perforated data card and each said embossment being shaped to fit within a said perforation, means for moving said carrier member relative to said feeler means, and means for biasing said feeler means against said perforated data card thereby to physically translate said feeler means into contact with a said embossment of the surface of said carrier member upon the encountering of a said perforation in said perforated data card.

12. A transducer in accordance with claim 11, in which said embossments are similar in shape to and slightly smaller in size than said perforations.

13. A transducer in accordance with claim 11, which said embossments have sides sloping inwardly from their base.

14. A transducer arrangement, which comprises a reference member, a feeler element normally biased against said reference member, means for moving said reference member relative to said feeler element in first and second opposite directions, and means for causing said feeler element to be raised against its said bias in said first direction of travel only, including a wedging element trapped beneath first and second portions of said feeler element, said wedging element contacting and tending to travel with said reference member, said first portion being positioned to restrain the travel of said wedging element during the movement of said reference member in said first direction and having a slope which causes said wedging element to wedge itself between said feeler element and said reference member so as to raise said feeler element, said second portion being positioned to restrain the travel of said wedging element during the movement of said reference member in said second direction and having a slope adapted to prevent a wedging action.

15. A transducer in accordance with claim 14, in which said wedging element is cylindrical in shape and arranged to roll with movement of said reference member.

16. A system for processing data over a telephone network by means of multi-frequency signals each comprising a distinct combination of simultaneously transmitted A.C. frequency signals and being coded to represent an individual character of said data, and including an arrangement for producing said multi-frequency signals in response to character-representing mechanical inputs in the form of perforations in a perforated data card in accordance with a preselected code, which comprises oscillator circuitry including a plurality of separate resonant circuit means and adapted to introduce a multi-frequency output signal from a combination of separate A.C. voltages derived respectively from said resonant circuit means, said oscillator circuitry including electrical connections adapted to apply said multi-frequency output signal to said network, each said resonant circuit means including a plurality of normally open resonant circuit paths each of which has a different operating frequency, each said plurality of resonant circuit paths including inductive element means and capacitive element means, one of said element means making available a plurality of terminals at different preselected element values and the other of said element means being connected to a common terminal, and a plurality of individual transducer elements each corresponding to a preselected one of said characters and each including a plurality of conductive feeler elements, a carrier member having a substantially continuous conductive surface adapted to receive said perforated data card thereon and arranged to position the face of said perforated data card in physical contact with said feeler elements, said surface having a plurality of embossments positioned to coincide with all possible locations of perforations in said perforated data card and each said embossment being shaped to fit within a said perforation, a plurality of two-contact switching elements each including said conductive surface connected to said common terminal and a different one of said feeler elements connected to a preselected one of said plurality of terminals in a different one of said resonant circuit means, respectively, means for moving said carrier member relative to said feeler elements, and means for biasing said feeler elements against said perforated data card thereby to physically translate said feeler elements into contact with the conductive surface of said carrier member upon the encountering of a said perforation in said perforated data card to coincidentally actuate said switching elements, whereby actuation of each said plurality of switching elements effects the simultaneous selection, combination and transmission of said separate voltages comprising one of said coded multi-frequency signals.

17. A system in accordance with claim 16, which further comprises a one-way switching means connected in series between said transducer means and said oscillator circuitry terminals for breaking said connection during the movement of said carrier member in a first given direction and for closing said connection during the movement of said carrier member in a second given direction, said one-way switching means including a perforated data card, a feeler element normally biased against said perforated data card, means for moving said reference member relative to said feeler element in first and second opposite directions in time coincidence respectively with the movement of said carrier member in said first and second given directions, and means for causing said feeler element to be raised against its said bias during one of said opposite directions of travel only, including a wedging element trapped beneath first and second portions of said feeler element, said wedging element contacting and tending to travel with said perforated data card, said first portion being positioned to restrain the travel of said wedging element during the movement of said perforated data card in one of said opposite directions of travel and having a slope which causes said wedging element to wedge itself between said feeler element and said perforated data card so as to raise said feeler element, said second portion being positioned to restrain the travel of said wedging element during the movement of said perforated data card in the other of said opposite directions of travel and having a slope adapted to prevent a wedging action.

18. A system for processing data over a telephone network by means of multi-frequency signals each comprising a distinct combination of simultaneously transmitted A.C. frequency signals, each of said combinations representing an individual character of said data, which comprises a plurality of A.C. voltage generating circuits each having a different operating frequency, each said generating circuit being electrically connected to apply an A.C. voltage therefrom to said telephone network when said circuit is closed, and a plurality of individual transducer elements each representing a preselected one of said characters and each including a plurality of switching elements actuable coincidentally in response to a mechanical input, each of said plurality of switching elements being electrically connected to effect the closure of a preselected different one of said generating circuits, whereby actuation of said switching elements effects the simultaneous selection, combination, and transmission of one of said coded multi-frequency signals.

19. A system for processing data over a telephone network by means of multi-frequency signals each coded to represent an individual character of said data and comprising a distinct combination of simultaneously transmitted A.C. frequency signals, and including an arrangement for producing said multi-frequency signals in response to character-representing mechanical inputs recorded on the face of a data card in accordance with a preselected code, which comprises a plurality of A.C. voltage generating circuits each having a different operating frequency, each said generating circuit being electrically connected to apply A.C. voltage therefrom to said telephone network when said circuit is closed, and a plurality of individual transducer elements each representing a preselected one of said characters and each including feeler means, switching means including said feeler means electrically connected to effect the coincidental closure of a preselected plurality of said generating circuits, means for positioning the face of a said data card in physical contact with said feeler means, means for biasing said feeler means against said data card, and means for effecting relative movement between said data card and said feeler means, said feeler means being designed to be physically translated to actuate said switching means in response to a mechanical input recorded on said data card, whereby actuation of said switching means effects the simultaneous selection, combination, and transmission of a said coded multi-frequency signal.

20. A system for processing data over a telephone network by means of multi-frequency signals each coded to represent an individual character of said data and comprising a distinct combination of simultaneously transmitted A.C. frequency signals, and including an arrangement for producing said multi-frequency signals in response to character-representing mechanical inputs recorded on the face of a data card in accordance with a preselected code, which comprises a plurality of A.C. voltage generating circuits each having a different operating frequency, each said generating circuit being electrically connected to apply A.C. voltage therefrom to said telephone network when said circuit is closed, and a plurality of individual transducer elements each representing a preselected one of said characters and each including feeler means, means for positioning the face of a said data card in physical contact with said feeler means, means for biasing said feeler means against said data card, means for effecting relative movement between said data card and said feeler means, said feeler means being designed to be physically translated in response to a mechanical input recorded on said data card, and a plurality of switching elements actuable coincidentally in response to the physical translation of said feeler means, each of said plurality of switching elements being electrically connected to effect the closure of a preselected and different one of said generating circuits, whereby actuation of said switching elements effects the simultaneous selection, combination, and transmission of a said coded multi-frequency signal.

21. A system for processing data over a telephone network by means of multi-frequency signals each coded to represent an individual character of said data and comprising a distinct combination of simultaneously transmitted A.C. frequency signals, and including an arrangement for producing said multi-frequency signals in response to character-representing mechanical inputs in the form of perforations recorded on the face of a data card in accordance with a preselected code, which comprises a plurality of A.C. voltage generating circuits each having a different operating frequency, each said generating circuit being electrically connected to apply A.C. voltage therefrom to said telephone network when said circuit is closed, and a plurality of individual transducer elements each representing a preselected one of said characters and each including conductive feeler means, a tray having a conductive surface adapted to receive a said data card thereon and arranged to position the face of said data card in physical contact with said feeler means, switching means including said feeler means and conductive surface electrically connected to effect coincidental closure of a preselected plurality of said generating circuits, means for moving said tray relative to said feeler means, and means for biasing said feeler means against said data card thereby to physically translate said feeler means into contact with the conductive surface of said tray upon the encountering of a said perforation in said data card to actuate said switching means, whereby actuation of said switching means effects the simultaneous selection, combination, and transmission of a said coded multi-frequency signal.

22. A system for processing data over a telephone network by means of multi-frequency signals each coded to represent an individual character of said data and comprising a distinct combination of simultaneously transmitted A.C. frequency signals, and including an arrangement for producing said multi-frequency signals in response to character-representing mechanical inputs in the form of embossments recorded on the face of a data card in accordance with a preselected car, which comprises a plurality of A.C. voltage generating circuits each having a different operating frequency, each said generating circuit being electrically connected to apply A.C. voltage therefrom to said telephone network when said circuit is closed, and a plurality of individual transducer elements each representing a preselected one of said characters and each including at least two individual feeler elements, switching means including said feeler elements electrically connected to effect the coincidental closure of a preselected plurality of said generating circuits, means for positioning the face of a said data card in physical contact with said feeler elements, means for biasing said feeler elements against said data card, and means for effecting relative movement between said feeler elements and said data card, the feeler elements being arranged so that only one feeler element at a time encounters a said embossment recorded on said data card, such feeler element being designed to be physically translated by the embossment into contact with the other relatively stationary feeler element to actuate said switching means, whereby actuation of said swiching means effects the simultaneous selection, combination and transmission of a said coded multi-frequency signal.

23. A data input translator for producing coded multi-frequency signals in response to perforations recorded in a card-like insulator, which comprises a plurality of A.C. voltage generating circuits each having a different operating frequency, each said generating circuit being electrically connected to apply an A.C. voltage therefrom to a common network when said circuit is closed and each having a switching element directly connected to close said circuit, said switching element including a conductive feeler element and a conductive bar adapter to be normally separated by said card-like insulator but to contact each other through a perforation in said insulator, and means for positioning a plurality of said switching elements in such close proximity as to permit their coincidental operation through the same perforation in said insulator.

24. A transducer responsive to both depressions and embossments recorded on a perforated data card member, which comprises a feeler means, means for positioning said card in physical contact with said feeler means, means for biasing said feeler means against said card, means for effecting relative movement between said card and said feeler means thereby to physically translate said feeler means in a first direction in response to a depression and in a second direction in response to an embossment, and switching means actuable in response to the physical translation of said feeler means in either direction.

References Cited in the file of this patent
UNITED STATES PATENTS

| | | |
|---|---|---|
| 2,111,117 | Lake | Mar. 15, 1938 |
| 2,338,305 | Simmon | June 4, 1944 |
| 2,388,748 | Kopetzky | Nov. 13, 1945 |
| 2,398,755 | Shepherd | Apr. 16, 1946 |
| 2,470,145 | Clos | May 17, 1949 |
| 2,473,438 | Mallina | June 14, 1949 |
| 2,553,910 | Gaffney et al. | May 22, 1951 |
| 2,564,410 | Schmidt | Aug. 14, 1951 |
| 2,575,052 | Foltzer | Nov. 13, 1951 |
| 2,639,340 | Gaite | May 19, 1953 |
| 2,671,165 | Gilpin | Mar. 2, 1954 |
| 2,673,034 | Smith | Mar. 23, 1954 |
| 2,675,544 | Trimble | Apr. 13, 1954 |
| 2,694,801 | Bachelet | Nov. 16, 1954 |
| 2,701,279 | Lovell et al. | Feb. 1, 1955 |
| 2,740,106 | Phelps | Mar. 27, 1956 |
| 2,843,319 | Deutsch | July 15, 1958 |
| 2,864,558 | Wockenfuss | Dec. 16, 1958 |
| 2,966,659 | Dahlbom et al. | Dec. 27, 1960 |

UNITED STATES PATENT OFFICE

CERTIFICATE OF CORRECTION

Patent No. 3,131,259                           April 28, 1964

Michael V. Di Iorio et al.

It is hereby certified that error appears in the above numbered patent requiring correction and that the said Letters Patent should read as corrected below.

Column 29, line 46, for "treminal" read -- terminal --; line 72, for "recoded" read -- recorded --; column 30, line 20, before "which" insert -- in --; line 56, for "introduce" read -- produce --; column 33, line 14, for "car" read -- code --; line 35, for "swiching" read -- switching --; column 34, line 4, for "adapter" read -- adapted --.

Signed and sealed this 15th day of September 1964.

(SEAL)
Attest:

ERNEST W. SWIDER                                          EDWARD J. BRENNER
Attesting Officer                                               Commissioner of Patents